United States Patent
McAndrew et al.

(10) Patent No.: US 12,041,204 B2
(45) Date of Patent: Jul. 16, 2024

(54) APPLICATION PROGRAMMING INTERFACE (API)-BASED CONCURRENT CALL PATH (CCP) PROVISIONING

(71) Applicant: Level 3 Communications, LLC, Broomfield, CO (US)

(72) Inventors: Bridget McAndrew, Denver, CO (US); Anne Kempen, Broomfield, CO (US); Sudhir Dadi, Westminster, CO (US); Kevin Michelsen, Penfield, NY (US); Chris Baker, Herculaneum, MO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 18/375,057

(22) Filed: Sep. 29, 2023

(65) Prior Publication Data

US 2024/0031491 A1    Jan. 25, 2024

Related U.S. Application Data

(63) Continuation of application No. 17/733,346, filed on Apr. 29, 2022, now Pat. No. 11,778,103.

(60) Provisional application No. 63/181,753, filed on Apr. 29, 2021.

(51) Int. Cl.
| | |
|---|---|
| *H04M 3/00* | (2024.01) |
| *H04M 5/00* | (2006.01) |
| *H04M 7/00* | (2006.01) |
| *H04L 12/66* | (2006.01) |

(52) U.S. Cl.
CPC ......... *H04M 7/006* (2013.01); *H04M 7/0096* (2013.01)

(58) Field of Classification Search
CPC ............... H04M 7/006; H04M 3/5191; H04M 3/42323; H04M 3/42314; H04M 3/56; H04M 3/5232; H04M 3/5237; H04M 7/0057; H04M 7/00; H04M 2207/12; H04M 3/4228; H04M 3/2254; H04M 7/0012; H04M 7/1225; H04M 7/0021; H04L 65/1069; H04L 65/1104; H04L 65/1101; H04L 67/10; H04L 65/1053; H04L 65/104; H04L 12/66; H04L 43/062; H04L 43/0876; H04L 12/2856; H04L 69/16; H04L 43/0888; H04L 43/0882; H04L 47/11
USPC ......... 379/220.01, 219, 229, 221.08, 201.12, 379/230; 370/352, 401, 353, 356, 493
See application file for complete search history.

(56) References Cited

U.S. PATENT DOCUMENTS

| | | |
|---|---|---|
| 10,630,840 B1 | 4/2020 | Karp |
| 2015/0207847 A1 | 7/2015 | Kim |
| 2022/0353372 A1 | 11/2022 | McAndrew |

*Primary Examiner* — Kharye Pope

(57) ABSTRACT

Novel tools and techniques are provided for implementing application programming interface ("API")-based concurrent call path ("CCP") provisioning. In various embodiments, in response to receiving a CCP provisioning request, a computing system may determine whether such a request would affect a set of trunk groups assigned to a customer based at least in part on network utilization data. If not, the computing system may cause the nodes in the network to increase or decrease, in near-real-time, the number of CCPs in at least one trunk group assigned to the customer based on the CCP provisioning request. If so, the computing system may cause the nodes in the network to increase or decrease, in near-real-time, the number of trunk groups assigned to the customer and may cause the nodes in the network to increase or decrease, in near-real-time, the number of CCPs in the updated number of trunk groups.

20 Claims, 11 Drawing Sheets

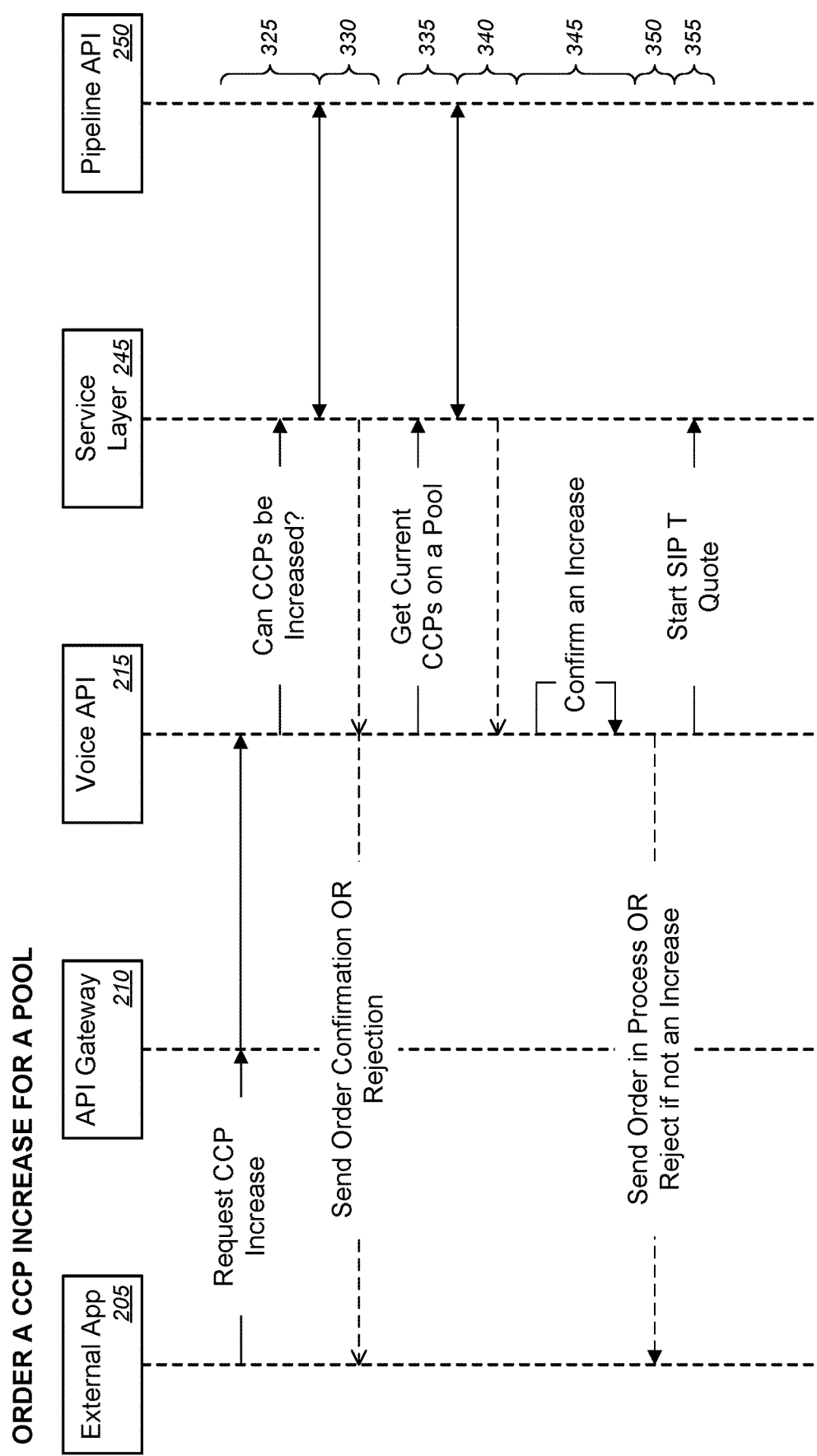

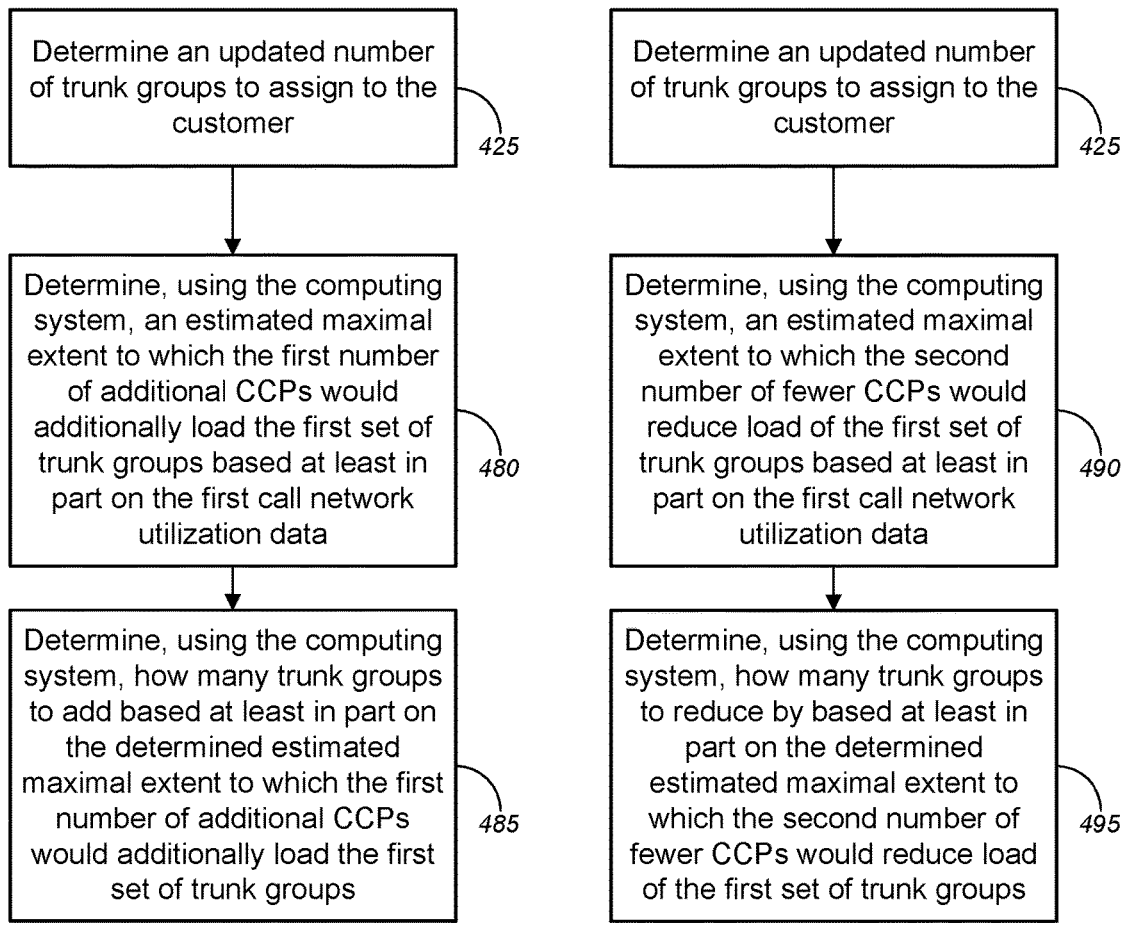

APPLICATION PROGRAMMING INTERFACE (API)-BASED CONCURRENT CALL PATH (CCP) PROVISIONING

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing calling service provisioning, and, more particularly, to methods, systems, and apparatuses for implementing application programming interface ("API")-based concurrent call path ("CCP") provisioning.

BACKGROUND

Traditionally, to increase or otherwise make a change in a concurrent call path ("CCP") amount, a customer of a service provider had to have a person manually monitor traffic and request changes (sometimes by personally calling to order a change in the number of CCPs), which increases the customer's costs and could take several days to implement.

Hence, there is a need for more robust and scalable solutions for implementing calling service provisioning, and, more particularly, to methods, systems, and apparatuses for implementing application programming interface ("API")-based CCP provisioning.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 3A-3C are sequence diagrams illustrating methods for requesting a current CCP total for a pool, validating CCPs can be increased for a pool, and ordering a CCP increase for a pool, in accordance with various embodiments.

FIGS. 4A-4F are flow diagrams illustrating a method for implementing API-based CCP provisioning, in accordance with various embodiments.

DETAILED DESCRIPTION OF CERTAIN EMBODIMENTS

Overview

Figure 1:
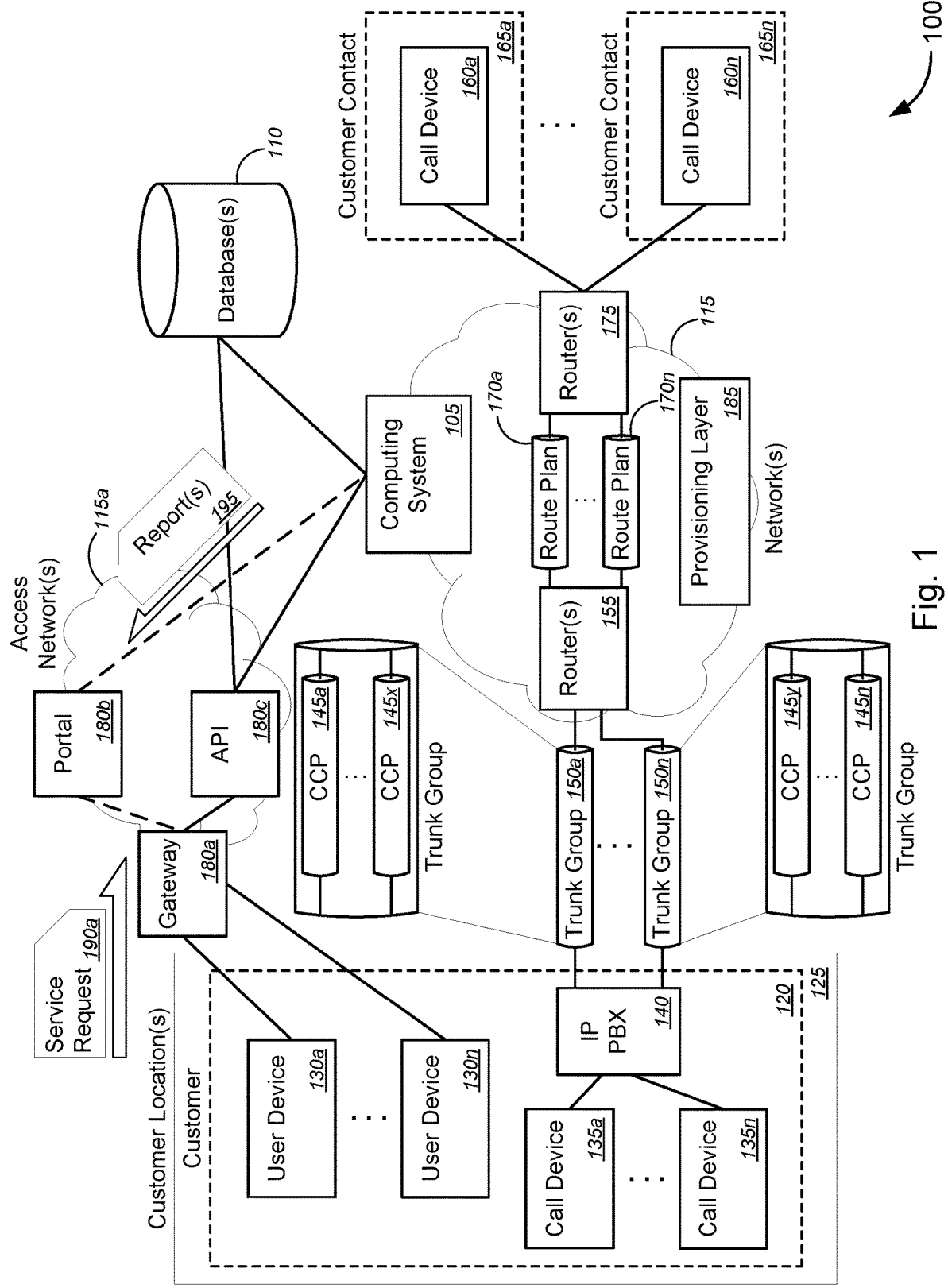
FIG. 1 is a schematic diagram illustrating a system for implementing application programming interface ("API")-based concurrent call path ("CCP") provisioning, in accordance with various embodiments.

Various embodiments provide tools and techniques for implementing calling service provisioning, and, more particularly, to methods, systems, and apparatuses for implementing application programming interface ("API")-based concurrent call path ("CCP") provisioning.

In various embodiments, a computing system may receive, via an application programming interface ("API") over a network(s), a concurrent call path ("CCP") provisioning request from a user device associated with a customer. The CCP provisioning request may comprise a request to change a number of CCPs for use by the customer.

The computing system may receive first call network utilization data, the first call network utilization data including, but not limited to, at least one of first data regarding utilization of one or more trunk groups of a first set of trunk groups assigned to the customer, second data regarding capacity of one or more trunk groups of the first set of trunk groups, or third data regarding utilization of one or more CCPs in each trunk group of the first set of trunk groups, and/or the like. In some cases, receiving first call network utilization data may comprise receiving first call network utilization data in one of a responsive manner (i.e., responsive to a specific request), a continual manner, a periodic manner, or a sporadic (or random) manner, and/or the like.

The computing system may determine whether the request to change the number of CCPs for use by the customer would affect the first set of trunk groups assigned to the customer based at least in part on the first call network utilization data. In some cases, the computing system may validate whether the customer is allowed to change the number of CCPs. If so, determining whether the request to change the number of CCPs for use by the customer would affect the first set of trunk groups assigned to the customer may be performed in response to validating that the customer is allowed to change the number of CCPs.

Based on a determination that the request to change the number of CCPs for use by the customer would have a low probability of affecting (or would not affect) the first set of trunk groups assigned to the customer, the computing system may send one or more first instructions in near-real-time to one or more nodes in the network(s) to increase or decrease, in near-real-time, the number of CCPs in at least one trunk group of the first set of trunk groups assigned to the customer based on the CCP provisioning request.

Alternatively, based on a determination that the request to change the number of CCPs for use by the customer would have a moderate to high probability of affecting (or would affect) at least one trunk group of the one or more trunk groups assigned to the customer, the computing system may: determine an updated number of trunk groups to assign to the customer based at least in part on a total number of CCPs requested in the request to change the number of CCPs and based at least in part on the first call network utilization data; send one or more second instructions in near-real-time to the one or more nodes in the network to increase or decrease, in near-real-time, the number of trunk groups among the first set of trunk groups assigned to the customer, resulting in a second set of trunk groups assigned to the customer, based at least in part on determined updated number of trunk groups; and send one or more third instructions in near-real-time to the one or more nodes in the network to increase or decrease, in near-real-time, the number of CCPs in at least one trunk group among the second set of trunk groups assigned to the customer based on the CCP provisioning request.

The various embodiments of the API-based CCP provisioning method and system enable more direct communication with the network(s) to change CCP and/or trunk group configurations (as well as amounts) with limited (and in some cases, no human interaction beyond potentially the initial order, although with established or set rules the initial ordering may be automated based on preset thresholds and triggers). As a result, changes are made in an efficient, low cost, and near-real-time (on the order of minutes or less than half an hour, or so) manner. The customer may also utilize the system to generate and send utilization reports, or the like, on a preset frequency (e.g., hourly, daily, etc.). These and other aspects of API-based CCP provisioning method and system are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, network provisioning technology, network configuration/reconfiguration technology, CCP provisioning technology, SIP trunk group provisioning technology, and/or the like. In other aspects, certain embodiments, can improve the functioning of user equipment or systems themselves (e.g., network provisioning systems, network configuration/reconfiguration systems, CCP provisioning systems, SIP trunk group provisioning systems, etc.), for example, by receiving, using a computing system and via an API over a network, a CCP provisioning request from a user device associated with a customer, wherein the CCP provisioning request comprises a request to change a number of CCPs for use by the customer; receiving, using the computing system, first call network utilization data, the first call network utilization data comprising at least one of first data regarding utilization of one or more trunk groups of a first set of trunk groups assigned to the customer, second data regarding capacity of one or more trunk groups of the first set of trunk groups, or third data regarding utilization of one or more CCPs in each trunk group of the first set of trunk groups; determining, using the computing system, whether the request to change the number of CCPs for use by the customer would affect the first set of trunk groups assigned to the customer based at least in part on the first call network utilization data; if not, sending, using the computing system, one or more first instructions in near-real-time to one or more nodes in the network to increase or decrease, in near-real-time, the number of CCPs in at least one trunk group of the first set of trunk groups assigned to the customer based on the CCP provisioning request; and if so, determining, using the computing system, an updated number of trunk groups to assign to the customer based at least in part on a total number of CCPs requested in the request to change the number of CCPs and based at least in part on the first call network utilization data; sending, using the computing system, one or more second instructions in near-real-time to the one or more nodes in the network to increase or decrease, in near-real-time, the number of trunk groups among the first set of trunk groups assigned to the customer, resulting in a second set of trunk groups assigned to the customer, based at least in part on determined updated number of trunk groups; and sending, using the computing system, one or more third instructions in near-real-time to the one or more nodes in the network to increase or decrease, in near-real-time, the number of CCPs in at least one trunk group among the second set of trunk groups assigned to the customer based on the CCP provisioning request; and/or the like.

In particular, to the extent any abstract concepts are present in the various embodiments, those concepts can be implemented as described herein by devices, software, systems, and methods that involve specific novel functionality (e.g., steps or operations), such as, in response to receiving the CCP provisioning request, the computing system determines whether such a request would affect the set of trunk groups assigned to the customer based at least in part on call network utilization data; if not, the computing system causes the nodes in the network to increase or decrease, in near-real-time, the number of CCPs in at least one trunk group based on the CCP provisioning request; and if so, the computing system causes the nodes in the network to increase or decrease, in near-real-time, the number of trunk groups assigned to the customer by a determined amount and causes the nodes in the network to increase or decrease, in near-real-time, the number of CCPs in the updated number of trunk groups, and/or the like, to name a few examples, that extend beyond mere conventional computer processing operations. These functionalities can produce tangible results outside of the implementing computer system, including, merely by way of example, optimized provisioning CCP and/or trunk groups by enabling more direct communication with the network(s) to change CCP and/or trunk group configurations (as well as amounts) in an efficient, low cost, and near-real-time (on the order of minutes or less than half an hour, or so) manner, and/or the like, at least some of which may be observed or measured by customers and/or service providers.

In an aspect, a method may comprise receiving, using a computing system and via an application programming interface ("API") over a network, a concurrent call path ("CCP") provisioning request from a user device associated with a customer, wherein the CCP provisioning request comprises a request to change a number of CCPs for use by the customer; receiving, using the computing system, first call network utilization data, the first call network utilization data comprising at least one of first data regarding utilization of one or more trunk groups of a first set of trunk groups assigned to the customer, second data regarding capacity of one or more trunk groups of the first set of trunk groups, or third data regarding utilization of one or more CCPs in each trunk group of the first set of trunk groups; and determining, using the computing system, whether the request to change the number of CCPs for use by the customer would affect the first set of trunk groups assigned to the customer based at least in part on the first call network utilization data. The method may also comprise, based on a determination that the request to change the number of CCPs for use by the customer would have a low probability of affecting the first set of trunk groups assigned to the customer, sending, using the computing system, one or more first instructions in near-real-time to one or more nodes in the network to increase or decrease, in near-real-time, the number of CCPs in at least one trunk group of the first set of trunk groups assigned to the customer based on the CCP provisioning request. The method may further comprise, based on a determination that the request to change the number of CCPs for use by the customer would have a moderate to high probability of affecting at least one trunk group of the one or more trunk groups assigned to the customer: determining, using the computing system, an updated number of trunk groups to assign to the customer based at least in part on a total number of CCPs requested in the request to change the number of CCPs and based at least in part on the first call network utilization data; sending, using the computing system, one or more second instructions in near-real-time to the one or more nodes in the network to increase or decrease, in near-real-time, the number of trunk groups among the first set of trunk groups assigned to the customer, resulting in a second set of trunk groups assigned to the customer, based at least in part on determined updated number of trunk groups; and sending, using the computing system, one or more third instructions in near-real-time to the one or more nodes in the network to increase or decrease, in near-real-time, the number of CCPs in at least one trunk group among the second set of trunk groups assigned to the customer based on the CCP provisioning request.

In some embodiments, the computing system may comprise at least one of an API platform computing system, an API gateway, a customer interface server, a call service reservation and ordering platform server, a gateway controller, a network provisioning server, a network operations center ("NOC"), a cloud computing system, or a distributed computing system. In some instances, each CCP among the one or more CCPs may be configurable as one of a bi-directional call path, a uni-directional outgoing call path, or a uni-directional incoming call path, and/or the like. In some cases, each CCP may be configured to enable a session initiation protocol ("SIP")-based communication session comprising at least one of a voice over Internet Protocol ("VoIP") call, an IP-based video call, or an instant message over IP, and/or the like.

According to some embodiments, receiving the CCP provisioning request from the user device associated with the customer may comprise receiving, using the computing system and via the API over the network, a CCP provisioning request through a user interface ("UI") displayed on the user device associated with the customer, wherein the UI comprises one of a portal-based UI, a webpage UI, or a software application ("app") UI running on the user device, and/or the like. In some cases, the UI may provide the customer with at least one of: one or more options to set a maximum utilization threshold for the first set of trunk groups for triggering a request to increase the of CCPs for use by the customer; one or more options to set a minimum utilization threshold for the first set of trunk groups for triggering a request to decrease the of CCPs for use by the customer; one or more options to set a maximum capacity threshold for the first set of trunk groups for triggering a request to increase the of CCPs for use by the customer; one or more options to set a minimum capacity threshold for the first set of trunk groups for triggering a request to decrease the of CCPs for use by the customer; one or more options to set a maximum utilization threshold for the one or more CCPs in each trunk group of the first set of trunk groups for triggering a request to increase the of CCPs for use by the customer; one or more options to set a minimum utilization threshold for the one or more CCPs in each trunk group of the first set of trunk groups for triggering a request to decrease the of CCPs for use by the customer; one or more options to change route plans; one or more options to set rules to automatically change route plans; one or more options to receive utilization reports; one or more options to set rules to automatically receive utilization reports; one or more options to receive trunk group inventory reports; one or more options to set rules to automatically receive trunk group inventory reports; one or more options to manually increase or decrease a number of CCPs; one or more options to set rules to automatically increase or decrease a number of CCPs; one or more options to manually increase or decrease a number of trunk groups; one or more options to set rules to automatically increase or decrease a number of trunk groups; or one or more options to set rules to send a notification to the customer in response to exceeding preset or default values for utilization threshold or capacity threshold; and/or the like. In some instances, receiving first call network utilization data may comprise receiving, using the computing system, first call network utilization data in one of a responsive manner, a continual manner, a periodic manner, or a sporadic manner, and/or the like.

In some embodiments, the method may further comprise: receiving, using the computing system and via the API over the network, a utilization report request from the user device associated with the customer, wherein the utilization report request may comprise a request for the computing system to send to the customer a utilization report summarizing at least one of current, average, or historical utilization data for each CCP and each trunk group assigned to the customer, or the like; and, in response to receiving the utilization report request, generating, using the computing system, a utilization report based at least in part on the received first call network utilization data, and sending, using the computing system, the utilization report to the customer.

Merely by way of example, in some cases, sending the utilization report to the customer may comprise sending, using the computing system, the utilization report as at least one of: one or more utilization data packets via the API to the user device; one or more utilization data packets via the API to one or more user devices designated by the customer; a graphics and text-based utilization report via electronic mail ("e-mail") to one or more e-mail addresses associated with the customer; a graphics and text-based utilization report via e-mail to one or more e-mail addresses designated by the customer; a graphics and text-based utilization report via physical mail to one or more physical addresses associated with the customer; a graphics and text-based utilization report via physical mail to one or more physical addresses designated by the customer; a graphics and text-based utilization report via a web-portal accessible by the customer; a text-based utilization summary report via one or more text messages to the user device; a text-based utilization summary report via one or more text messages to one or more user devices designated by the customer; a graphics and text-based utilization summary report via one or more multi-media messages to the user device; or a graphics and text-based utilization summary report via one or more multi-media messages to one or more user devices designated by the customer; and/or the like. In some instances, the utilization report request and the CCP provisioning request may be automatically sent by the user device based on one or more preset triggers or thresholds established by the customer.

According to some embodiments, determining that the request to change the number of CCPs for use by the customer would have a low probability of affecting the first set of trunk groups assigned to the customer may comprise at least one of: determining that an increase in the number of CCPs for use by the customer would have a low probability of overloading the first set of trunk groups based at least in part on the first call network utilization data; determining that a decrease in the number of CCPs for use by the customer would have a low probability of resulting in excess capacity of the first set of trunk groups beyond a predetermined threshold amount based at least in part on the first call network utilization data; or determining that the first set of trunk groups has only one trunk group and the request to change the number of CCPs comprises a request to decrease the number of CCPs for use by the customer.

In some embodiments, the request to change the number of CCPs may comprise a request to increase the number of CCPs for use by the customer by a first number of additional CCPs, wherein determining the updated number of trunk groups to assign to the customer may comprise: determining, using the computing system, an estimated maximal extent to which the first number of additional CCPs would additionally load the first set of trunk groups based at least in part on the first call network utilization data; and determining, using the computing system, how many trunk groups to add based at least in part on the determined estimated maximal extent to which the first number of additional CCPs would additionally load the first set of trunk groups.

Alternatively, the request to change the number of CCPs may comprise a request to decrease the number of CCPs for use by the customer by a second number of fewer CCPs, wherein determining the updated number of trunk groups to assign to the customer may comprise: determining, using the computing system, an estimated maximal extent to which the second number of fewer CCPs would reduce load of the first set of trunk groups based at least in part on the first call network utilization data; and determining, using the computing system, how many trunk groups to reduce by based at least in part on the determined estimated maximal extent to which the second number of fewer CCPs would reduce load of the first set of trunk groups.

According to some embodiments, the method may further comprise validating, using the computing system, whether the customer is allowed to change the number of CCPs, wherein determining whether the request to change the number of CCPs for use by the customer would affect the first set of trunk groups assigned to the customer may be performed in response to validating that the customer is allowed to change the number of CCPs.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: receive, via an application programming interface ("API") over a network, a concurrent call path ("CCP") provisioning request from a user device associated with a customer, wherein the CCP provisioning request comprises a request to change a number of CCPs for use by the customer; receive first call network utilization data, the first call network utilization data comprising at least one of first data regarding utilization of one or more trunk groups of a first set of trunk groups assigned to the customer, second data regarding capacity of one or more trunk groups of the first set of trunk groups, or third data regarding utilization of one or more CCPs in each trunk group of the first set of trunk groups; determine whether the request to change the number of CCPs for use by the customer would affect the first set of trunk groups assigned to the customer based at least in part on the first call network utilization data; based on a determination that the request to change the number of CCPs for use by the customer would have a low probability of affecting the first set of trunk groups assigned to the customer, send one or more first instructions in near-real-time to one or more nodes in the network to increase or decrease, in near-real-time, the number of CCPs in at least one trunk group of the first set of trunk groups assigned to the customer based on the CCP provisioning request; and based on a determination that the request to change the number of CCPs for use by the customer would have a moderate to high probability of affecting at least one trunk group of the one or more trunk groups assigned to the customer: determine an updated number of trunk groups to assign to the customer based at least in part on a total number of CCPs requested in the request to change the number of CCPs and based at least in part on the first call network utilization data; send one or more second instructions in near-real-time to the one or more nodes in the network to increase or decrease, in near-real-time, the number of trunk groups among the first set of trunk groups assigned to the customer, resulting in a second set of trunk groups assigned to the customer, based at least in part on determined updated number of trunk groups; and send one or more third instructions in near-real-time to the one or more nodes in the network to increase or decrease, in near-real-time, the number of CCPs in at least one trunk group among the second set of trunk groups assigned to the customer based on the CCP provisioning request.

In yet another aspect, a system might comprise a computing system, which might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: receive, via an application programming interface ("API") over a network, a concurrent call path ("CCP") provisioning request from a user device associated with a customer, wherein the CCP provisioning request comprises a request to change a number of CCPs for use by the customer; receive first call network utilization data, the first call network utilization data comprising at least one of first data regarding utilization of one or more trunk groups of a first set of trunk groups assigned to the customer, second data regarding capacity of one or more trunk groups of the first set of trunk groups, or third data regarding utilization of one or more CCPs in each trunk group of the first set of trunk groups; determine whether the request to change the number of CCPs for use by the customer would affect the first set of trunk groups assigned to the customer based at least in part on the first call network utilization data; based on a determination that the request to change the number of CCPs for use by the customer would have a low probability of affecting the first set of trunk groups assigned to the customer, send one or more first instructions in near-real-time to one or more nodes in the network to increase or decrease, in near-real-time, the number of CCPs in at least one trunk group of the first set of trunk groups assigned to the customer based on the CCP provisioning request; and based on a determination that the request to change the number of CCPs for use by the customer would have a moderate to high probability of affecting at least one trunk group of the one or more trunk groups assigned to the customer: determine an updated number of trunk groups to assign to the customer based at least in part on a total number of CCPs requested in the request to change the number of CCPs and based at least in part on the first call network utilization data; send one or more second instructions in near-real-time to the one or more nodes in the network to increase or decrease, in near-real-time, the number of trunk groups among the first set of trunk groups assigned to the customer, resulting in a second set of trunk groups assigned to the customer, based at least in part on determined updated number of trunk groups; and send one or more third instructions in near-real-time to the one or more nodes in the network to increase or decrease, in near-real-time, the number of CCPs in at least one trunk group among the second set of trunk groups assigned to the customer based on the CCP provisioning request.

In some embodiments, the computing system may comprise at least one of an API platform computing system, an API gateway, a customer interface server, a call service reservation and ordering platform server, a gateway controller, a network provisioning server, a network operations center ("NOC"), a cloud computing system, or a distributed computing system.

According to some embodiments, the first set of instructions, when executed by the at least one first processor, further causes the computing system to: receive, via the API over the network, a utilization report request from the user device associated with the customer, wherein the utilization report request comprises a request for the computing system to send to the customer a utilization report summarizing at least one of current, average, or historical utilization data for each CCP and each trunk group assigned to the customer; and, in response to receiving the utilization report request, generate a utilization report based at least in part on the received first call network utilization data, and send the utilization report to the customer.

In some embodiments, receiving the CCP provisioning request from the user device associated with the customer may comprise receiving, via the API over the network, a CCP provisioning request through a user interface ("UI") displayed on the user device associated with the customer, wherein the UI may comprise one of a portal-based UI, a webpage UI, or a software application ("app") UI running on the user device, and/or the like.

Merely by way of example, in some cases, the UI provides the customer with at least one of: one or more options to set a maximum utilization threshold for the first set of trunk groups for triggering a request to increase the of CCPs for use by the customer; one or more options to set a minimum utilization threshold for the first set of trunk groups for triggering a request to decrease the of CCPs for use by the customer; one or more options to set a maximum capacity threshold for the first set of trunk groups for triggering a request to increase the of CCPs for use by the customer; one or more options to set a minimum capacity threshold for the first set of trunk groups for triggering a request to decrease the of CCPs for use by the customer; one or more options to set a maximum utilization threshold for the one or more CCPs in each trunk group of the first set of trunk groups for triggering a request to increase the of CCPs for use by the customer; one or more options to set a minimum utilization threshold for the one or more CCPs in each trunk group of the first set of trunk groups for triggering a request to decrease the of CCPs for use by the customer; one or more options to change route plans; one or more options to set rules to automatically change route plans; one or more options to receive utilization reports; one or more options to set rules to automatically receive utilization reports; one or more options to receive trunk group inventory reports; one or more options to set rules to automatically receive trunk group inventory reports; one or more options to manually increase or decrease a number of CCPs; one or more options to set rules to automatically increase or decrease a number of CCPs; one or more options to manually increase or decrease a number of trunk groups; one or more options to set rules to automatically increase or decrease a number of trunk groups; or one or more options to set rules to send a notification to the customer in response to exceeding preset or default values for utilization threshold or capacity threshold.

Various modifications and additions can be made to the embodiments discussed without departing from the scope of the invention. For example, while the embodiments described above refer to particular features, the scope of this invention also includes embodiments having different combination of features and embodiments that do not include all of the above described features.

SPECIFIC EXEMPLARY EMBODIMENTS

We now turn to the embodiments as illustrated by the drawings. FIGS. 1-6 illustrate some of the features of the method, system, and apparatus for implementing calling service provisioning, and, more particularly, to methods, systems, and apparatuses for implementing application programming interface ("API")-based concurrent call path ("CCP") provisioning, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing application programming interface ("API")-based concurrent call path ("CCP") provisioning, in accordance with various embodiments.

In the non-limiting embodiment of FIG. 1, system 100 may comprise a computing system 105 and corresponding database(s) 110 that may be disposed or located within network(s) 115 and/or access network(s) 115a (which may be part of network(s) 115 associated with a first service provider, an extension of network(s) 115, or a different but communicatively coupled network(s) with respect to network(s) 115 (in some cases, associated with a second service provider different from the first service provider), or the like). A customer 120, who may be associated with, or may have service arrangements with the first service provider for, one or more customer locations 125, which may include, without limitation, at least one of a multi-dwelling unit ("MDU") within a multi-dwelling complex (including, but not limited to, an apartment building, an apartment complex, a condominium complex, a townhouse complex, a mixed-use building, etc.), a motel, an inn, a hotel, an office building or complex, a commercial building or complex, an industrial building or complex, a hospital or other medical facility, a research facility, a university (or other post-secondary) building or buildings within a campus, and/or the like. At the customer location(s) 125, the customer may have, or may be associated with, one or more user devices 130a-130n (collectively, "user devices 130" or the like), one or more call devices 135a-135n (collectively, "call devices 135" or the like), and an Internet Protocol private branch exchange ("IP PBX") 140.

In some embodiments, the computing system 105 may include, without limitation, at least one of an API platform computing system, an API gateway, a customer interface server, a call service reservation and ordering platform server, a gateway controller, a network provisioning server, a network operations center ("NOC"), a cloud computing system, or a distributed computing system, and/or the like. In some cases, the one or more user devices 130 may each include, but is limited to, one of a desktop computer, a laptop computer, a tablet computer, a smart phone, a mobile phone, or any suitable device capable of communicating with computing system 105 via a web-based portal, an application programming interface ("API"), a server, a software application ("app"), or any other suitable communications interface, or the like. In some instances, the one or more call devices 135 may each include, without limitation, one of a voice over Internet Protocol ("VoIP")-capable wired telephone, a desktop computer with VoIP communications software or app, a laptop computer with VoIP communications software or app, a tablet computer with VoIP communications software or app, a smart phone with VoIP communications software or app, a mobile phone with VoIP communications software or app, or any other suitable call device with VoIP communications software or app, or the like. In some cases, at least one user device 130 may overlap with, or may be the same as, at least one call device 135. Alternatively, or additionally, at least one other user device 130 may be different from at least one other call device 135 (which, in such cases, may be a dedicated call device, or the like). In some instances, the IP PBX 140 may comprise a VoIP gateway, and in some cases may connect telephone extensions to a public switched telephone network ("PSTN") while providing internal communication among the call devices 135. The call devices 135 may communicatively couple with the IP PBX 140 over wired or wireless connections within customer location(s) 125.

According to some embodiments, network(s) 115 and access network(s) 115a may each include, without limitation, one of a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network(s) 115 and access network(s) 115a may each include an access network of the service provider (e.g., an Internet service provider ("ISP")). In another embodiment, the network(s) 115 and access network(s) 115a may each include a core network of the service provider and/or the Internet.

System 100 may further comprise one or more concurrent call paths ("CCPs") 145a-145n (collectively, "CCPs 145" or the like) within one or more trunk groups 150a-150n (collectively, "trunk groups 150" or the like) between IP PBX 140 and router(s) 155 of network 115. In the case that there is only one trunk group 150 between IP PBX 140 and router(s) 155, all CCPs 145a-145n would be configured within the trunk group. In the case that the number of CCPs exceeds the capacity of a single trunk group, the CCPs 145 would be configured within two or more trunk groups 150 (such as shown in FIG. 1, in which CCPs 145a-145x are configured within trunk group 150a, while CCPs 145y-145n are configured within trunk group 150n, with CCPs 145x-145y being configured within trunk groups 150b-150[n−1] (not shown)). In some cases, each CCP among the one or more CCPs 145 may be configurable as one of a bi-directional call path, a uni-directional outgoing call path, or a uni-directional incoming call path, or the like. Each CCP may be configured to enable a session initiation protocol ("SIP")-based communication session comprising at least one of a VoIP call, an IP-based video call, or an instant message over IP, and/or the like.

When a call device (e.g., call device 135a) associated with the customer 120 initiates a SIP request to establish a call with a call device (e.g., call device 160a) associated with a customer contact 165a (i.e., any third party or destination party) among a plurality of call devices 160a-160n (which may be similar to call devices 135a-135n) correspondingly associated with customer contacts 165a-165n, and when network(s) 115 establishes the requested call, the established call path extends the call connection from call device 135a, through IP PBX 140, through one of the CCP 145 configured within one of the trunk groups 150, through router(s) 115, through one of route plans 170a-170n, through router(s) 175, to call device 160a.

Likewise, when a customer contact (e.g., customer contact 165n), using call device (e.g., call device 160n), initiates a SIP request to establish a call with a specific call device (e.g., call device 135n) associated with customer 120, and when the network(s) 115 establishes the requested call, the established call path extends the call connection from call device 160n, through router(s) 175, through one of route plans 170a-170n, through router(s) 155, through one of the CCP 145 configured within one of the trunk groups 150, through IP PBX 140, to call device 135n. Alternatively, when a customer contact (e.g., customer contact 165n), using call device (e.g., call device 160n), initiates a SIP request to establish a call with the customer 120 using a call center telephone number associated with the customer 120, and when the network(s) 115 establishes the requested call, the established call path extends the call connection from call device 160n, through router(s) 175, through one of route plans 170a-170n, through router(s) 155, through one of the CCP 145 configured within one of the trunk groups 150, through IP PBX 140, to an assigned call device 135 among the call devices 135a-135n (where the assigned call device 135 is either randomly assigned, assigned based on availability, or assigned based on other factors, or the like).

For various reasons—including, but not limited to, expending business, re-organizing business, anticipating increased call volume (e.g., for a planned sale; for a planned launch of the customer's new service(s) or product(s); to address concerns from users of the customer's products or services due to recalls, a data breach, or other issues etc.; etc.), anticipating decreased call volume (e.g., due to upcoming holidays; due to local, regional, or national emergencies; etc.), seeking efficient balance between call volume capability and un-used services, and/or the like—the customer may desire to change (typically in near-real-time) the number of CCPs 145 assigned to it by the first service provider. In some cases, for similar reasons, the customer may desire to change (also typically in near-real-time) the number of trunk groups 150 assigned to it. Alternatively, or additionally, the customer may desire to receive utilization reports regarding CCP usage, trunk group usage and capacity, and/or the like. The various embodiments provide such functionality to the customer, as described below.

In operation, computing system 105 may receive—via gateway 180a, portal 180b, and/or API 180c over a network (s) 115 and/or 115a—a CCP provisioning request (e.g., in service request 190a, or the like) from a user device 130 associated with customer 120. The CCP provisioning request may comprise a request to change a number of CCPs for use by the customer.

The computing system 105 may receive first call network utilization data, the first call network utilization data including, but not limited to, at least one of first data regarding utilization of one or more trunk groups of a first set of trunk groups assigned to the customer, second data regarding capacity of one or more trunk groups of the first set of trunk groups, or third data regarding utilization of one or more CCPs in each trunk group of the first set of trunk groups, and/or the like. In some cases, receiving first call network utilization data may comprise receiving first call network utilization data in one of a responsive manner (i.e., responsive to a specific request), a continual manner, a periodic manner, or a sporadic (or random) manner, and/or the like.

The computing system 105 may determine whether the request to change the number of CCPs for use by the customer would affect the first set of trunk groups assigned to the customer based at least in part on the first call network utilization data. In some cases, the computing system 105 may validate whether the customer is allowed to change the number of CCPs. If so, determining whether the request to change the number of CCPs for use by the customer would affect the first set of trunk groups assigned to the customer may be performed in response to validating that the customer is allowed to change the number of CCPs.

Based on a determination that the request to change the number of CCPs for use by the customer would have a low probability of affecting (or would not affect) the first set of trunk groups assigned to the customer, the computing system 105 may send one or more first instructions in near-real-time to one or more nodes (e.g., router(s) 155, in some cases, via provisioning layer 185, or the like) in the network(s) 115 to increase or decrease, in near-real-time, the number of CCPs 145 in at least one trunk group of the first set of trunk groups 150 assigned to the customer 120 based on the CCP provisioning request 190a.

Alternatively, based on a determination that the request to change the number of CCPs for use by the customer would have a moderate to high probability of affecting (or would affect) at least one trunk group of the one or more trunk groups assigned to the customer, the computing system 105 may: determine an updated number of trunk groups to assign to the customer based at least in part on a total number of CCPs requested in the request to change the number of CCPs and based at least in part on the first call network utilization data; send one or more second instructions in near-real-time to the one or more nodes in the network to increase or decrease, in near-real-time, the number of trunk groups among the first set of trunk groups assigned to the customer, resulting in a second set of trunk groups assigned to the customer, based at least in part on determined updated number of trunk groups; and send one or more third instructions in near-real-time to the one or more nodes in the network to increase or decrease, in near-real-time, the number of CCPs in at least one trunk group among the second set of trunk groups assigned to the customer based on the CCP provisioning request.

In some embodiments, determining that the request to change the number of CCPs for use by the customer would have a low probability of affecting the first set of trunk groups assigned to the customer may comprise at least one of: determining that an increase in the number of CCPs for use by the customer would have a low probability of overloading the first set of trunk groups based at least in part on the first call network utilization data; determining that a decrease in the number of CCPs for use by the customer would have a low probability of resulting in excess capacity of the first set of trunk groups beyond a predetermined threshold amount based at least in part on the first call network utilization data; or determining that the first set of trunk groups has only one trunk group and the request to change the number of CCPs comprises a request to decrease the number of CCPs for use by the customer; and/or the like.

According to some embodiments, in the case that the request to change the number of CCPs comprises a request to increase the number of CCPs for use by the customer by a first number of additional CCPs, determining the updated number of trunk groups to assign to the customer may comprise determining an estimated maximal extent to which the first number of additional CCPs would additionally load the first set of trunk groups based at least in part on the first call network utilization data; and determining how many trunk groups to add based at least in part on the determined estimated maximal extent to which the first number of additional CCPs would additionally load the first set of trunk groups.

Alternatively, in the case that the request to change the number of CCPs comprises a request to decrease the number of CCPs for use by the customer by a second number of fewer CCPs, determining the updated number of trunk groups to assign to the customer may comprise determining an estimated maximal extent to which the second number of fewer CCPs would reduce load of the first set of trunk groups based at least in part on the first call network utilization data; and determining how many trunk groups to reduce by based at least in part on the determined estimated maximal extent to which the second number of fewer CCPs would reduce load of the first set of trunk groups.

In some embodiments, computing system 105 might receive—via gateway 180a, portal 180b, and/or API 180c over a network(s) 115 and/or 115a—a utilization report request (e.g., in service request 190a, or the like) from the user device 130 associated with the customer 120. The utilization report request may comprise a request for the computing system to send to the customer a utilization report summarizing at least one of current, average, or historical utilization data for each CCP and each trunk group assigned to the customer, and/or the like. In response to receiving the utilization report request, computing system 105 may generate a utilization report (e.g., report(s) 195, or the like) based at least in part on the received first call network utilization data, and may send the utilization report (e.g., report(s) 195, or the like) to the customer (in some cases, to the requesting user device 130, or to a designated user device, or the like).

According to some embodiments, receiving the service request 190a (which may include, but is not limited to, the CCP provisioning request, the utilization report request, or other suitable service requests, or the like) from the user device associated with the customer may comprise receiving, via gateway 180a, portal 180b, and/or API 180c over a network(s) 115 and/or 115a, the service request through a user interface ("UI") displayed on the user device 13 associated with the customer 120, where the UI comprises one of a portal-based UI, a webpage UI, or a software application ("app") UI running on the user device, and/or the like. The UI may also provide the customer with other options for configuring their service with the first service provider. For instance, the UI may provide the customer with at least one of: one or more options to set a maximum utilization threshold for the first set of trunk groups for triggering a request to increase the of CCPs for use by the customer; one or more options to set a minimum utilization threshold for the first set of trunk groups for triggering a request to decrease the of CCPs for use by the customer; one or more options to set a maximum capacity threshold for the first set of trunk groups for triggering a request to increase the of CCPs for use by the customer; one or more options to set a minimum capacity threshold for the first set of trunk groups for triggering a request to decrease the of CCPs for use by the customer; one or more options to set a maximum utilization threshold for the one or more CCPs in each trunk group of the first set of trunk groups for triggering a request to increase the of CCPs for use by the customer; one or more options to set a minimum utilization threshold for the one or more CCPs in each trunk group of the first set of trunk groups for triggering a request to decrease the of CCPs for use by the customer; one or more options to change route plans; one or more options to set rules to automatically change route plans; one or more options to receive utilization reports (e.g., report(s) 195, or the like); one or more options to set rules to automatically receive utilization reports (e.g., report(s) 195, or the like); one or more options to receive trunk group inventory reports (e.g., report(s) 195, or the like); one or more options to set rules to automatically receive trunk group inventory reports (e.g., report(s) 195, or the like); one or more options to manually increase or decrease a number of CCPs; one or more options to set rules to automatically increase or decrease a number of CCPs; one or more options to manually increase or decrease a number of trunk groups; one or more options to set rules to automatically increase or decrease a number of trunk groups; or one or more options to set rules to send a notification to the customer in response to exceeding preset or default values for utilization threshold or capacity threshold; and/or the like.

In a non-limiting example, a customer, anticipating an increase in call volumes during an upcoming planned sale (e.g., Black Friday sale, etc.), desires to increase the number of CCPs assigned to it. The customer may send a service request (e.g., service request 190a) comprising a CCP provisioning requesting indicating a request to increase the number of CCPs. In some cases, the customer may send the service request via the API, providing the number of CCPs that the customer would like to increase by or the total number of CCPs that the customer would like to have assigned, and in some cases, identification and/or authentication information as well.

The computing system receives the service request, and, in some cases, validates the customer's request and the customer's identification and/or authentication information. Provided that the customer is validated as being allowed to change (in this case, increase) the number of CCPs, the computing system might determine whether the total number of CCPs now requested (or the number that the CCPs would increase by) would exceed the capacity of the existing trunk group(s) assigned to the customer. If not, the computing system would update the CCP pool size (e.g., in an ENASS Master File or other database), and instructions would be generated and sent, in near-real-time (e.g., within a few seconds, within a few minutes, or within about 30 minutes, or the like), to one or more nodes and/or routers to increase the number of CCPs by the requested number to the requested total number of CCPs in the existing trunk groups assigned to the customer, with the changes to the number of CCPs being performed in near-real-time (e.g., within about 30 minutes, ideally a few minutes, or the like). Billing for the customer's CCP and related services would also be updated, and the CCP inventory would be similarly updated.

In another non-limiting example, a call center customer, experiencing fluctuations in call volumes, may desire to have a sufficiently large number of CCPs to handle call volumes but also does not want to over-subscribe and pay for unused CCPs. In such a case, the customer may send a service request (e.g., service request 190a) via a UI in which the customer selects at least one of the following options: one or more options to set a maximum utilization threshold (e.g., 79.99%, or the like) for the first set of trunk groups for triggering a request to increase the of CCPs for use by the customer; one or more options to set a minimum utilization threshold (e.g., 40%, or the like) for the first set of trunk groups for triggering a request to decrease the of CCPs for use by the customer; one or more options to set a maximum capacity threshold (e.g., 79.99%, or the like) for the first set of trunk groups for triggering a request to increase the of CCPs for use by the customer; one or more options to set a minimum capacity threshold (e.g., 40%, or the like) for the first set of trunk groups for triggering a request to decrease the of CCPs for use by the customer; one or more options to set a maximum utilization threshold (e.g., 79.99%, or the like) for the one or more CCPs in each trunk group of the first set of trunk groups for triggering a request to increase the of CCPs for use by the customer; one or more options to set a minimum utilization threshold (e.g., 40%, or the like) for the one or more CCPs in each trunk group of the first set of trunk groups for triggering a request to decrease the of CCPs for use by the customer; one or more options to set rules to automatically increase or decrease a number of CCPs; one or more options to set rules to automatically increase or decrease a number of trunk groups; or one or more options to set rules to send a notification to the customer in response to exceeding preset or default values for utilization threshold or capacity threshold; and/or the like. Once the customer finalizes and submits the service request based on selections of at least one of the sets of options indicated above, the UI would send the service request 190 to the computing system. In some cases, using the UI, the customer's identification and/or authentication information may be automatically relayed to the computing system automatically when requested by the computing system, if not already sent (or in addition to being sent) within service request 190.

The computing system receives the service request, and, in some cases, validates the customer's request and the customer's identification and/or authentication information. Provided that the customer is validated as being allowed to change (in this case, dynamically increase or decrease) the number of CCPs and/or the number of trunk groups, the computing system might dynamically analyze utilization data for the customer's assigned CCPs and utilization and capacity data for the customer's assigned trunk groups, and might adjust, in near-real-time (e.g., within a few seconds, within a few minutes, or within about 30 minutes, or the like), the number of CCPs and/or trunk groups assigned to the customer based at least in part on optimizing algorithms and based at least in part on one or more of the selected maximum (or peak) and/or minimum utilization thresholds for the trunk groups, the selected maximum (or peak) and/or minimum capacity thresholds for the trunk groups, the selected maximum (or peak) and/or minimum utilization for CCPs, the selected rules for increasing and/or decreasing the number of CCPs, and/or the selected rules for increasing and/or decreasing the number of trunk groups. In any event, the number of CCPs cannot exceed the capacity of the total number of trunk groups, and thus the computing system would increase the number of trunk groups accordingly. For each update or change to the number of CCPs and/or trunk groups, the computing system would update the CCP pool size (e.g., in an ENASS Master File or other database) and/or the trunk group inventory, and instructions would be generated and sent, in near-real-time (e.g., within a few seconds, within a few minutes, or within about 30 minutes, or the like), to one or more nodes and/or routers to increase or decrease the number of CCPs and/or to increase or decrease the number of trunk groups by the determined optimized updated number of CCPs and/or trunk groups, with the changes to the number of CCPs and changes to the trunk groups being performed in near-real-time (e.g., within about 30 minutes, ideally a few minutes, or the like). Billing for the customer's CCP and related services would also be updated, and the CCP and/or trunk group inventories would be similarly updated.

In yet another non-limiting example, a customer may desire to have real-time or near-real-time information on CCP utilization so that it can make informed and immediate business decisions. Rather than having a person manually monitor traffic and request changes (sometimes by personally calling to order a change), which increases the customer's costs and could take several days to implement, the customer merely sends a utilization report request (as discussed above), and the computing system, which continually monitors utilization data in the network(s), may generate and send the utilization report to the customer. The customer may elect to receive such utilization report as a one-time report in response to its query (per query), to receive such utilization report on a periodic basis (e.g., once every minute, once every half an hour, once every hour, a set number of times an hour, once every several hours, once every day, a set number of times a day, once every set number of days, once every week, a set number of times every week, once every two weeks, once every month, a set number of times a month, once every fiscal quarter, a set number of times every fiscal quarter, once every year, a set number of times a year, and so on), or to receive such utilization report every time a change exceeds a predetermined threshold amount within a predetermined window or time period (e.g., utilization of CCPs or utilization of trunk groups exceeds a predetermined percent (e.g., 5% or 10%) within a predetermined window (e.g., 1 minute, 5 minutes, 10 minutes, 15 minutes, 30 minutes, 1 hour, 1 day, etc.); capacity of trunk groups drops by a predetermined percent (e.g., 5% or 10%) within a predetermined window (e.g., 1 minute, 5 minutes, 10 minutes, 15 minutes, 30 minutes, 1 hour, 1 day, etc.); or the like), and/or the like. Based on the utilization report results, the customer may decide to send service requests to change the number of CCPs and/or trunk groups on an ad hoc basis, or may decide to set rules and/or thresholds for the computing system to automatically change the number of CCPs and/or trunk groups assigned to the customer.

According to some embodiments, the computing system 105, while monitoring utilization data in the network(s), may determine that one or more trunk groups fail. In response to failure of each trunk group, the computing system may change routing algorithms for the failed trunk group. If changing the routing algorithms does not fix the issue with the failed trunk group, the computing system may attempt one or more additional re-routes by repeating the change of routing algorithms for the failed trunk group. After a preset number of failed attempts to re-route the failed trunk group, the computing system may move the affected CCPs to a new trunk group. In some cases, the computing system may send the affected customer a notification indicating that a trunk group has failed and whether the computing system was successful in re-routing the failed trunk group or had moved the affected CCPs to a new trunk group.

In some embodiments, the computing system 105 may provide the customer (in some cases, via the UI) with options to include a customer premises equipment ("CPE") IP address, options to provide a trunk group inventory report, options to implement international telephone number ("TN") blocking on a trunk group, options to change dialing restrictions for restricted trunk groups, options to send a notification in the event of a trunk group failure, options to set whether or not to change routing algorithms in response to trunk group failure, options to set a number of re-routes to try prior to moving to a new trunk group, and/or the like.

These and other functions of the system 100 (and its components) are described in greater detail below with respect to FIGS. 2-4.

Figure 2A:
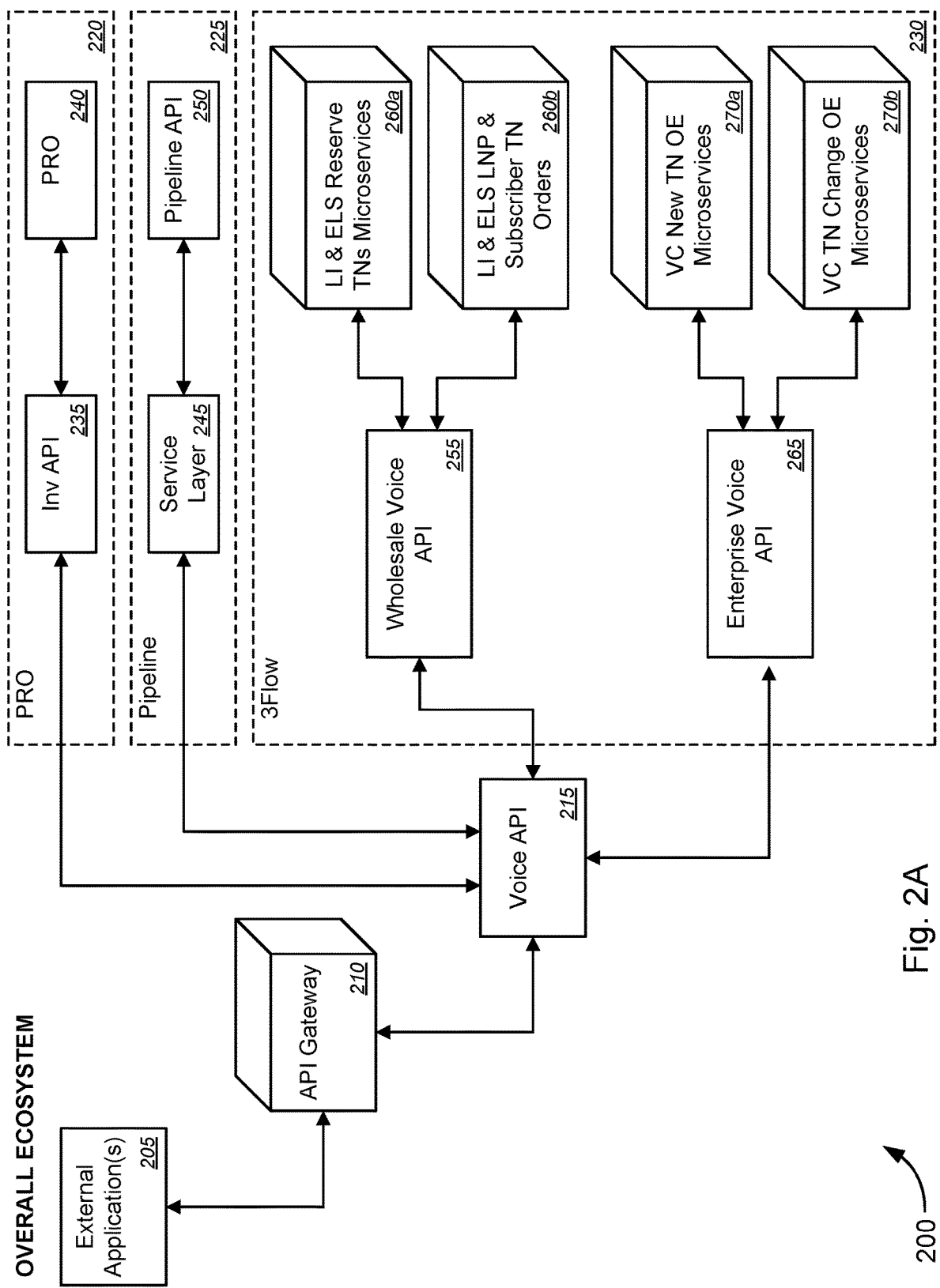
FIGS. 2A and 2B are block flow diagrams illustrating a non-limiting example of an ecosystem and portions thereof that may be used for implementing API-based CCP provisioning, in accordance with various embodiments.
Figure 2B:
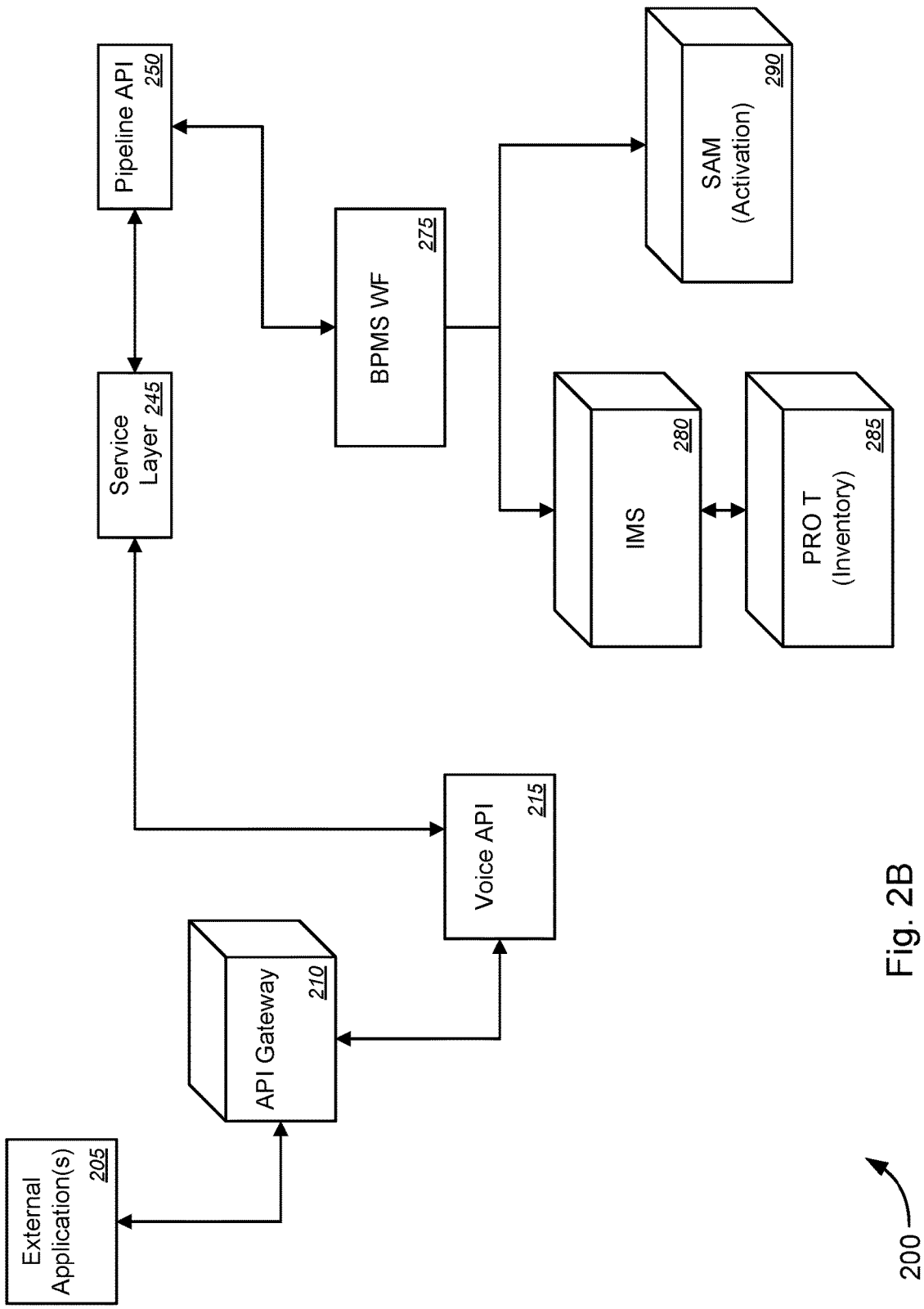

FIGS. 2A and 2B (collectively, "FIG. 2") are block flow diagrams illustrating a non-limiting example 200 of an ecosystem and portions thereof that may be used for implementing API-based CCP provisioning, in accordance with various embodiments. FIG. 2 is intended to provide a different perspective with respect to the ecosystem (FIG. 2A) and the portions of the ecosystem for processing CCP change requests (FIG. 2B), and is not limited to such functionalities, but may be applicable to some (if not all) of the functionalities described above with respect to FIG. 1, or the like.

With reference to the non-limiting example 200 of FIG. 2A, an overall ecosystem may comprise external application(s) 205 (which may correspond to application(s) used by the customer 120, third party partners, or third party vendors, or the like), an API gateway 210 (which may correspond to gateway 180a, or the like; and which provides authentication and authorization functionality, or the like), voice API 215 (which may correspond to API 180c, or the like), and various portions 220-230, including, but not limited to, a network provisioning portion 220 (referred to herein as "PRO" portion 220, or the like), a pipeline portion 225, a legacy portion 230 (referred to herein as "3Flow" or the like), etc. According to some embodiments, the voice API or voice API layer 215 may be configured to validate customers and/or to orchestrate requests and responses with other systems.

In some embodiments, the PRO portion 220 may comprise an inventory API 235 and a PRO database 240. By providing a service ID, a customer may communicate with the voice API 215 (via external application(s) 205 and API gateway 210) to query PRO database 240 (in some cases, using a GET command, or the like) via inventory API 235 for administration information (e.g., inventory data, etc.) and/or route plan names, and/or the like.

According to some embodiments, the pipeline portion 225 may comprise service layer 245 and a pipeline API 250. By providing a service ID, a customer may communicate with the voice API 215 (via external application(s) 205 and API gateway 210) to query pipeline API 250 (in some cases, using a GET command, or the like) via service layer 245 for a remote location list, or the like.

In some embodiments, the legacy portion 230 may comprise a wholesale voice API 255, a local inbound and enhanced local services ("LI & ELS") reserve telephone number ("TN") microservices system 260a, and an "LI & ELS" local number porting ("LNP") & subscriber TN orders microservices system 260b. By providing state or rate center number of telephone numbers ("State/RC # of TNs"), a customer may communicate with the voice API 215 (via external application(s) 205 and API gateway 210) to send a request to one or more of wholesale voice API 255 and/or microservices system 260a or 260b to reserve one or more TNs, with a response or output including messages and an array of TNs reserved. Alternatively, or additionally, the legacy portion 230 may further comprise an enterprise voice API 265, a new telephone number order entry (such as a Voice Complete© new telephone number order entry ("VC New TN OE" or the like)) microservices system 270a, and a telephone number change order entry (such as a Voice Complete® telephone number change order entry ("VC TN Change OE" or the like)) microservices system 270b. By providing a number of TNs desired per remote location, a customer may communicate with the voice API 215 (via external application(s) 205 and API gateway 210) to send a request to one or more of enterprise voice API 265 and/or microservices system 270b to order new TNs, with a response or output including messages and an order confirmation with TN details. By providing TNs and addresses, a customer may communicate with the voice API 215 (via external application(s) 205 and API gateway 210) to send a request to one or more of enterprise voice API 265 and/or microservices system 270b to change 911 and location information, with a response or output including messages and an order confirmation. According to some embodiments, the wholesale voice API 255 and the enterprise voice API 265 may be configured to act as, and/or to perform functionalities of, an orchestrator to their respective microservices systems 260a-260b and 270a-270b.

Although not shown, authentication functionality—including, but not limited to, using SSL and/or token-based authentication, or the like—may be implemented to implement database encryption and/or internal network encryption, or the like.

Turning to FIG. 2B, a portion of the ecosystem of FIG. 2A is shown together with extended portions beyond the pipeline portion 225 for processing CCP change requests. This portion of the ecosystem may provide services, including, but not limited to, providing current CCP count on a Pool, indicating whether or not CCP count is updateable, providing options to change the CCP amount, and/or the like. For instance, by providing a service ID, a customer may communicate with the voice API 215 (via external application(s) 205 and API gateway 210) to query pipeline API 250 via service layer 245 for a current CCP total and/or an indication as to whether CCP number change is allowed, or the like. Alternatively, or additionally, by providing a service ID and a new number of CCPs (or one of a number of CCPs to increase by or a number of CCPs to decrease by, or the like), a customer may communicate with the voice API 215 (via external application(s) 205 and API gateway 210) to send a request to pipeline API 250 via service layer 245 to change the number of CCPs (or to update the CCP total), or the like, with a response or output including messages and an order confirmation. To implement the ordered change in the number of CCPs, the pipeline API 250 may send instructions to business process management software ("BPMS") workflow ("WF") system 275, which is a provisioning workflow engine that: (a) sends instructions to an IP multimedia subsystem ("IMS") 280 to update a PRO T inventory system 285 with the change in inventory of CCPs; and (b) sends instructions to a service application manager ("SAM") 290 to activate the change in the number of CCPs assigned to the customer in the network(s).

Figure 3A:
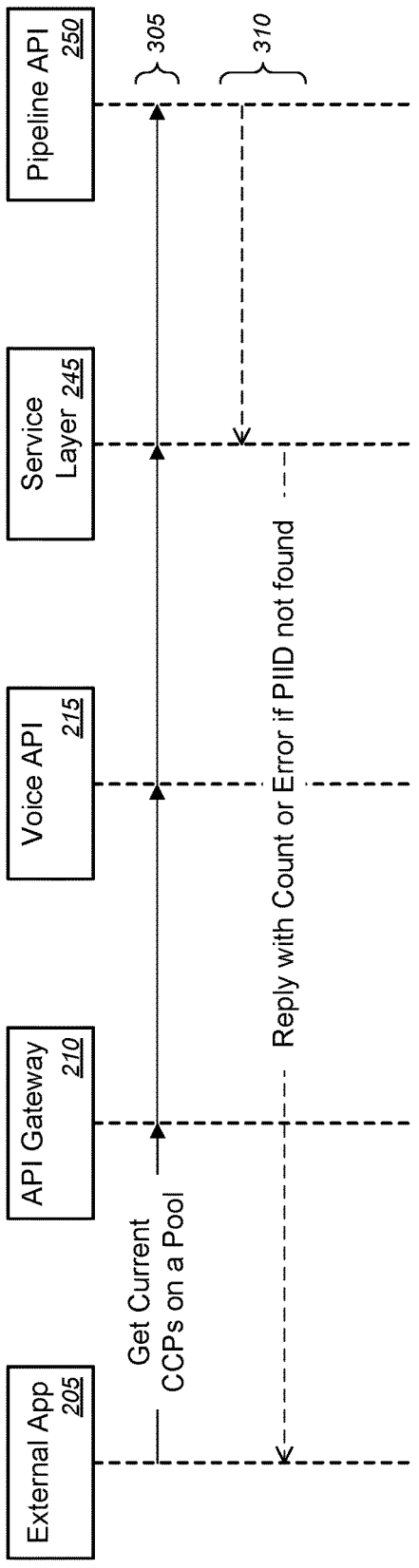
Figure 3B:
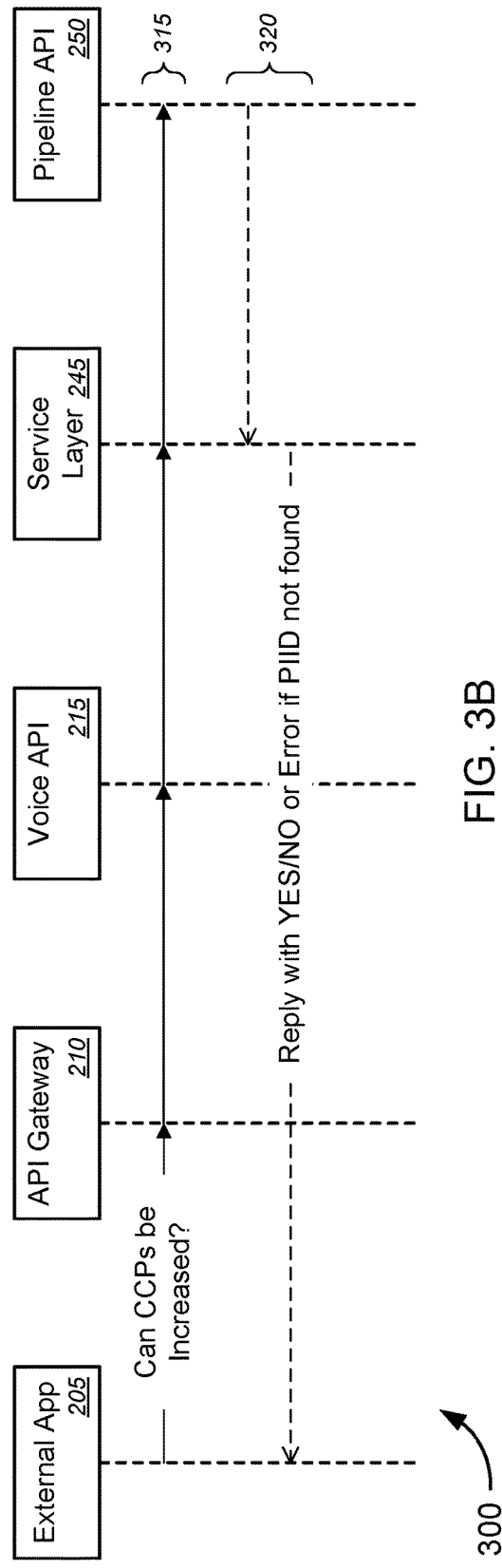

FIGS. 3A-3C (collectively, "FIG. 3") are sequence diagrams illustrating methods 300 for requesting a current CCP total for a pool (FIG. 3A), validating CCPs can be increased for a pool (FIG. 3B), and ordering a CCP increase for a pool (FIG. 3C), in accordance with various embodiments. FIG. 3 is intended to provide some of the service requests and functionalities described above with respect to FIG. 1, or the like, and thus is not limited to only these presented requests and functionalities, but may apply to any suitable requests and/or functionalities either described herein (with respect to FIGS. 1-4) or reasonably extending therefrom, or the like. In FIG. 3, external application 205, API gateway (or B2B gateway) 210, and voice API (or OE API) 215 may respectively correspond to (i) application(s) used by the customer 120, third party partners, or third party vendors, or the like; (ii) gateway 180a, or the like; and (iii) API 180c, or the like; and/or the like. Service layer (or TibcoOE) 245 and/or pipeline API (or pipeline) 250 may correspond to provisioning layer 185, or the like.

Referring to the non-limiting example of FIG. 3A, a customer may request a current CCP total for a Pool (in some cases, using a Get command, or the like). In operation, at process 305, a customer, using external application 205, may send a request to pipeline API 250, via API gateway 210, via voice API 215, and via service layer 245, to get or obtain a current CCP total for a pool. At process 310, the pipeline API 250 may respond by either sending a reply with a CCP count or sending an error message if the PIID is not found. Although not shown in FIG. 3, the processes depicted in FIG. 3A may also be applicable to getting or obtaining CCP utilization reports, getting or obtaining trunk group utilization reports, or getting or obtaining trunk group capacity reports, and/or the like.

Turning to the non-limiting example of FIG. 3B, a customer may validate whether CCPs may be increased. In operation, at process 315, a customer, using external application 205, may send a query to pipeline API 250, via API gateway 210, via voice API 215, and via service layer 245, to determine whether CCPs assigned to the customer may be increased. At process 320, the pipeline API 250 may respond by either sending a reply with a Yes or No response or sending an error message if the PIID is not found. Although not shown in FIG. 3, the processes depicted in FIG. 3B may also be applicable to querying whether CCPs may be decreased, querying whether trunk groups may be increased, or querying whether trunk groups may be decreased, and/or the like.

With reference to FIG. 3C, a customer may order a CCP increase for a pool. In operation, at process 325, a customer, using external application 205, may send a service request to pipeline API 250, via API gateway 210, via voice API 215, and via service layer 245, to order an increase in the number of CCPs for a pool. At process 330, the pipeline API 250 may respond by either sending an order confirmation or sending an order rejection. At process 335, the voice API 215 may get the current total number of CCPs on the pool, with the pipeline API 250 responding (at process 340). At process 345 the voice API 215 may confirm an increase. At process 350, the voice API 215 may respond to the external application 205 by either sending a notification that the order is in process or sending a rejection notification indicating no increase in CCPs. At process 355, voice API 215 may send instructions to service layer 245 to start a SIP T quote. Although not shown in FIG. 3, the processes depicted in FIG. 3B may also be applicable to ordering a CCP decrease for a pool, ordering a trunk group increase for a pool, or ordering a trunk group decrease for a pool, and/or the like.

FIGS. 4A-4F (collectively, "FIG. 4") are flow diagrams illustrating a method 400 for implementing API-based CCP provisioning, in accordance with various embodiments. Method 400 of FIG. 4A continues onto FIG. 4B following the circular marker denoted, "A."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, and 300 of FIGS. 1, 2, and 3, respectively (or components thereof), such methods may also be implemented using any suitable hardware (or software) implementation. Similarly, while each of the systems, examples, or embodiments 100, 200, and 300 of FIGS. 1, 2, and 3, respectively (or components thereof), can operate according to the method 400 illustrated by FIG. 4 (e.g., by executing instructions embodied on a computer readable medium), the systems, examples, or embodiments 100, 200, and 300 of FIGS. 1, 2, and 3 can each also operate according to other modes of operation and/or perform other suitable procedures.

Figure 4A:
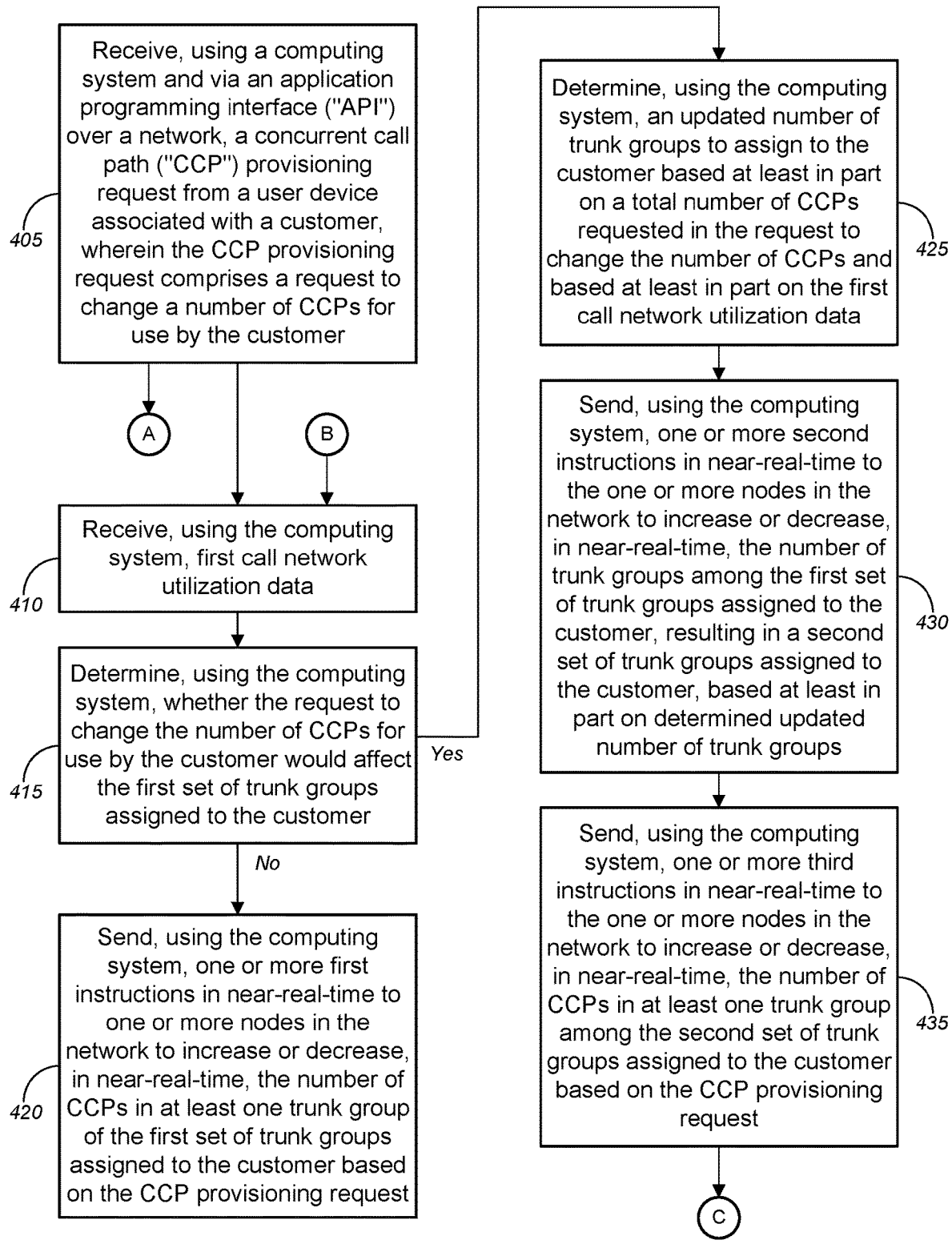

In the non-limiting embodiment of FIG. 4A, method 400, at block 405, may comprise receiving, using a computing system and via an application programming interface ("API") over a network, a concurrent call path ("CCP") provisioning request from a user device associated with a customer, wherein the CCP provisioning request comprises a request to change a number of CCPs for use by the customer. In some embodiments, the computing system may include, without limitation, at least one of an API platform computing system, an API gateway, a customer interface server, a call service reservation and ordering platform server, a gateway controller, a network provisioning server, a network operations center ("NOC"), a cloud computing system, or a distributed computing system, and/or the like. In some instances, each CCP among the one or more CCPs may be configurable as one of a bi-directional call path, a uni-directional outgoing call path, or a uni-directional incoming call path, and/or the like. In some cases, each CCP may be configured to enable a session initiation protocol ("SIP")-based communication session comprising at least one of a voice over Internet Protocol ("VoIP") call, an IP-based video call, or an instant message over IP, and/or the like.

According to some embodiments, receiving the CCP provisioning request from the user device associated with the customer may comprise receiving, using the computing system and via the API over the network, a CCP provisioning request through a user interface ("UI") displayed on the user device associated with the customer, wherein the UI comprises one of a portal-based UI, a webpage UI, or a software application ("app") UI running on the user device, and/or the like. In some instances, the UI may provide the customer with at least one of: one or more options to set a maximum utilization threshold for the first set of trunk groups for triggering a request to increase the of CCPs for use by the customer; one or more options to set a minimum utilization threshold for the first set of trunk groups for triggering a request to decrease the of CCPs for use by the customer; one or more options to set a maximum capacity threshold for the first set of trunk groups for triggering a request to increase the of CCPs for use by the customer; one or more options to set a minimum capacity threshold for the first set of trunk groups for triggering a request to decrease the of CCPs for use by the customer; one or more options to set a maximum utilization threshold for the one or more CCPs in each trunk group of the first set of trunk groups for triggering a request to increase the of CCPs for use by the customer; one or more options to set a minimum utilization threshold for the one or more CCPs in each trunk group of the first set of trunk groups for triggering a request to decrease the of CCPs for use by the customer; one or more options to change route plans; one or more options to set rules to automatically change route plans; one or more options to receive utilization reports; one or more options to set rules to automatically receive utilization reports; one or more options to receive trunk group inventory reports; one or more options to set rules to automatically receive trunk group inventory reports; one or more options to manually increase or decrease a number of CCPs; one or more options to set rules to automatically increase or decrease a number of CCPs; one or more options to manually increase or decrease a number of trunk groups; one or more options to set rules to automatically increase or decrease a number of trunk groups; or one or more options to set rules to send a notification to the customer in response to exceeding preset or default values for utilization threshold or capacity threshold; and/or the like.

Figure 4B:
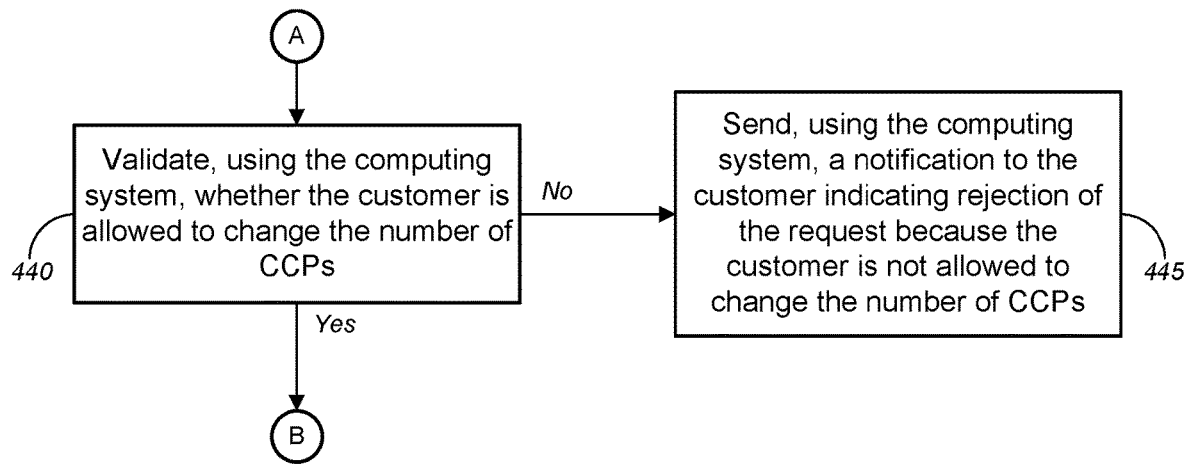

Method 400 may either continue onto the process at block 410 or continue onto the process at block 440 in FIG. 4B following the circular marker denoted, "A." At block 440 in FIG. 4B (following the circular marker denoted, "A"), method 400 may comprise validating, using the computing system, whether the customer is allowed to change the number of CCPs. If not, method 400 may comprise sending, using the computing system, a notification to the customer indicating rejection of the request because the customer is not allowed to change the number of CCPs (block 445). If so, method 400 may return to the process at block 410 in FIG. 4A.

At block 410 in FIG. 4A (following the circular marker denoted, "B"), method 400 may comprise receiving, using the computing system, first call network utilization data, the first call network utilization data including, but not limited to, at least one of first data regarding utilization of one or more trunk groups of a first set of trunk groups assigned to the customer, second data regarding capacity of one or more trunk groups of the first set of trunk groups, or third data regarding utilization of one or more CCPs in each trunk group of the first set of trunk groups, and/or the like. In some embodiments, receiving first call network utilization data may comprise receiving, using the computing system, first call network utilization data in one of a responsive manner, a continual manner, a periodic manner, or a sporadic manner, and/or the like.

Method 400 may further comprise, at block 415, determining, using the computing system, whether the request to change the number of CCPs for use by the customer would affect the first set of trunk groups assigned to the customer based at least in part on the first call network utilization data. If not, or based on a determination that the request to change the number of CCPs for use by the customer would have a low probability of affecting the first set of trunk groups assigned to the customer, method 400 may further comprise sending, using the computing system, one or more first instructions in near-real-time to one or more nodes in the network to increase or decrease, in near-real-time, the number of CCPs in at least one trunk group of the first set of trunk groups assigned to the customer based on the CCP provisioning request (block 420). If so, or based on a determination that the request to change the number of CCPs for use by the customer would have a moderate to high probability of affecting at least one trunk group of the one or more trunk groups assigned to the customer, method 400 may further comprise: determining, using the computing system, an updated number of trunk groups to assign to the customer based at least in part on a total number of CCPs requested in the request to change the number of CCPs and based at least in part on the first call network utilization data (block 425); sending, using the computing system, one or more second instructions in near-real-time to the one or more nodes in the network to increase or decrease, in near-real-time, the number of trunk groups among the first set of trunk groups assigned to the customer, resulting in a second set of trunk groups assigned to the customer, based at least in part on determined updated number of trunk groups (block 430); and sending, using the computing system, one or more third instructions in near-real-time to the one or more nodes in the network to increase or decrease, in near-real-time, the number of CCPs in at least one trunk group among the second set of trunk groups assigned to the customer based on the CCP provisioning request (block 435).

Figure 4C:
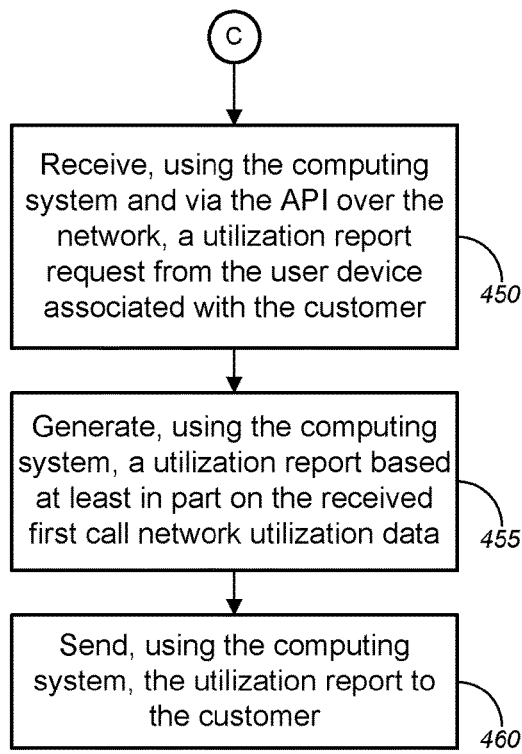

Method 400 may continue onto the process at block 450 in FIG. 4C following the circular marker denoted, "C." At block 450 in FIG. 4C (following the circular marker denoted, "C"), method 400 may comprise receiving, using the computing system and via the API over the network, a utilization report request from the user device associated with the customer, wherein the utilization report request comprises a request for the computing system to send to the customer a utilization report summarizing at least one of current, average, or historical utilization data for each CCP and each trunk group assigned to the customer, and/or the like. In response to receiving the utilization report request, method may further comprise generating, using the computing system, a utilization report based at least in part on the received first call network utilization data (block 455); and sending, using the computing system, the utilization report to the customer (block 460).

According to some embodiments, sending the utilization report to the customer may comprise sending, using the computing system, the utilization report as at least one of: one or more utilization data packets via the API to the user device; one or more utilization data packets via the API to one or more user devices designated by the customer; a graphics and text-based utilization report via electronic mail ("e-mail") to one or more e-mail addresses associated with the customer; a graphics and text-based utilization report via e-mail to one or more e-mail addresses designated by the customer; a graphics and text-based utilization report via physical mail to one or more physical addresses associated with the customer; a graphics and text-based utilization report via physical mail to one or more physical addresses designated by the customer; a graphics and text-based utilization report via a web-portal accessible by the customer; a text-based utilization summary report via one or more text messages to the user device; a text-based utilization summary report via one or more text messages to one or more user devices designated by the customer; a graphics and text-based utilization summary report via one or more multi-media messages to the user device; or a graphics and text-based utilization summary report via one or more multi-media messages to one or more user devices designated by the customer; and/or the like. In some cases, the utilization report request and the CCP provisioning request may be automatically sent by the user device based on one or more preset triggers or thresholds established by the customer.

Figure 4D:
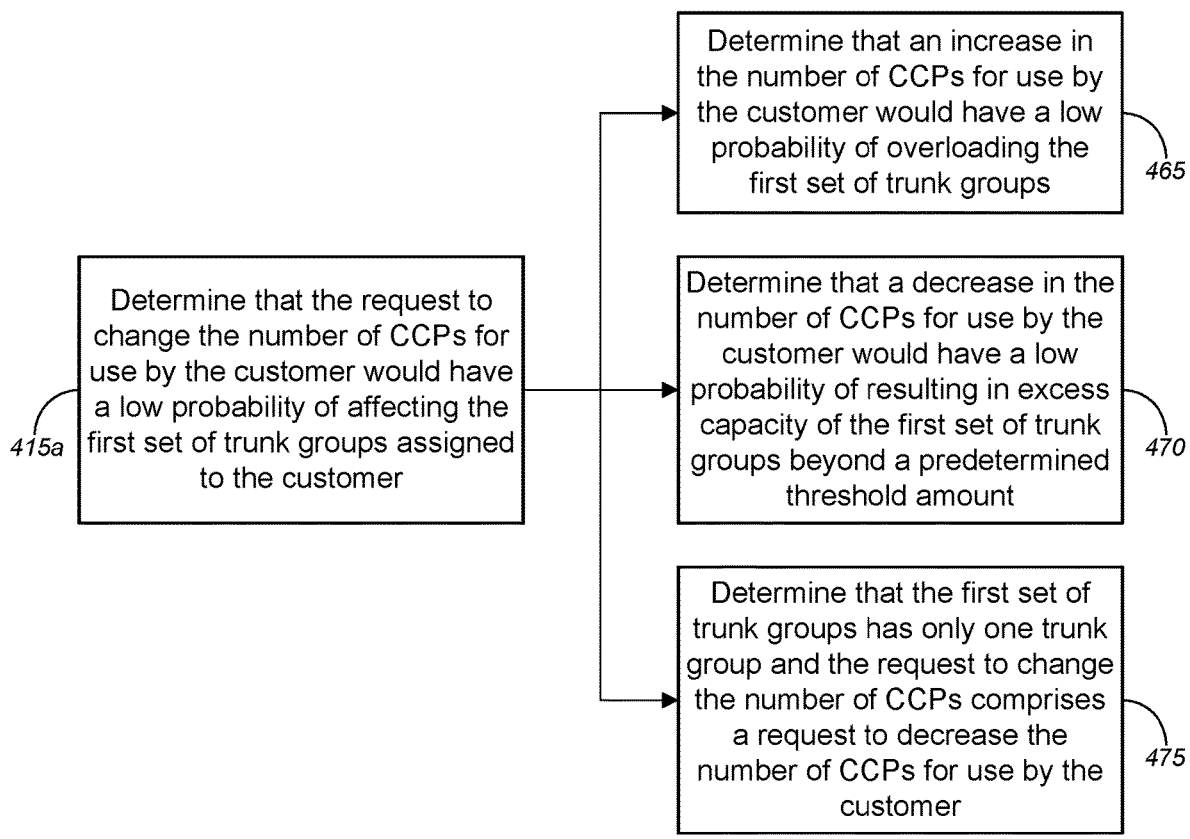

With reference to FIG. 4D, determining that the request to change the number of CCPs for use by the customer would have a low probability of affecting the first set of trunk groups assigned to the customer (at block 415a) may comprise at least one of: determining that an increase in the number of CCPs for use by the customer would have a low probability of overloading the first set of trunk groups based at least in part on the first call network utilization data (block 465); determining that a decrease in the number of CCPs for use by the customer would have a low probability of resulting in excess capacity of the first set of trunk groups beyond a predetermined threshold amount based at least in part on the first call network utilization data (block 470); or determining that the first set of trunk groups has only one trunk group and the request to change the number of CCPs comprises a request to decrease the number of CCPs for use by the customer (block 475); and/or the like.

Turning to FIG. 4E, in the case that the request to change the number of CCPs comprises a request to increase the number of CCPs for use by the customer by a first number of additional CCPs, determining the updated number of trunk groups to assign to the customer (at block 425) may comprise: determining, using the computing system, an estimated maximal extent to which the first number of additional CCPs would additionally load the first set of trunk groups based at least in part on the first call network utilization data (block 480); and determining, using the computing system, how many trunk groups to add based at least in part on the determined estimated maximal extent to which the first number of additional CCPs would additionally load the first set of trunk groups (block 485).

Referring to FIG. 4F, in the case that the request to change the number of CCPs comprises a request to decrease the number of CCPs for use by the customer by a second number of fewer CCPs, determining the updated number of trunk groups to assign to the customer (at block 425) may comprise: determining, using the computing system, an estimated maximal extent to which the second number of fewer CCPs would reduce load of the first set of trunk groups based at least in part on the first call network utilization data (block 490); and determining, using the computing system, how many trunk groups to reduce by based at least in part on the determined estimated maximal extent to which the second number of fewer CCPs would reduce load of the first set of trunk groups (block 495).

Exemplary System and Hardware Implementation

Figure 5:
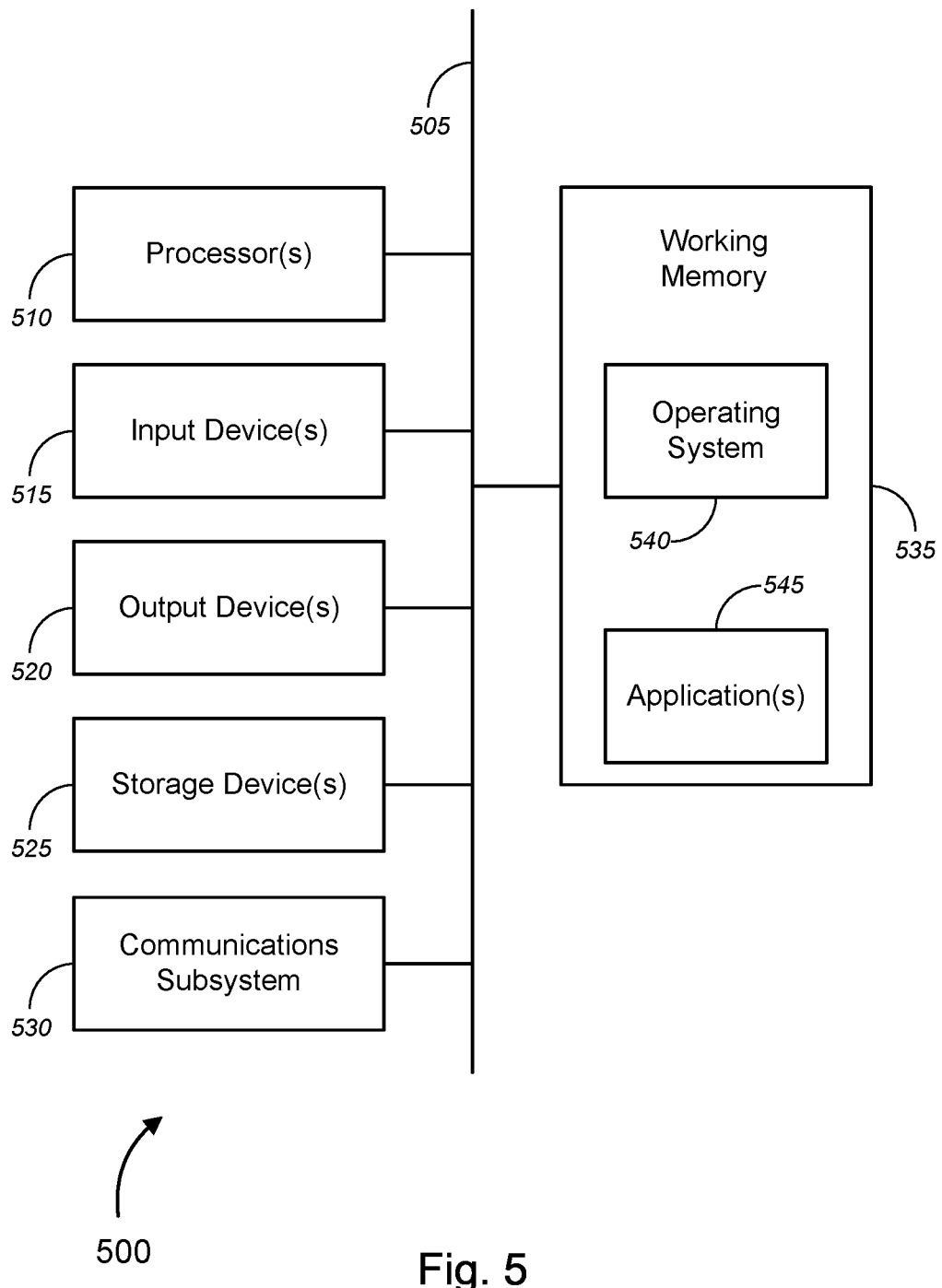
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., computing system 105, user devices 130*a*-130*n*, routers 155 and 175, gateway 180*a*, provisioning layer 185, API gateway 210, microservices 260*a*, 260*b*, 270*a*, and 270*b*, IP Multimedia Subsystem ("IMS") 280, PRO T inventory system 285, and service application manager ("SAM") 290, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., computing system 105, user devices 130*a*-130*n*, routers 155 and 175, gateway 180*a*, provisioning layer 185, API gateway 210, microservices 260*a*, 260*b*, 270*a*, and 270*b*, IMS 280, PRO T inventory system 285, and SAM 290, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
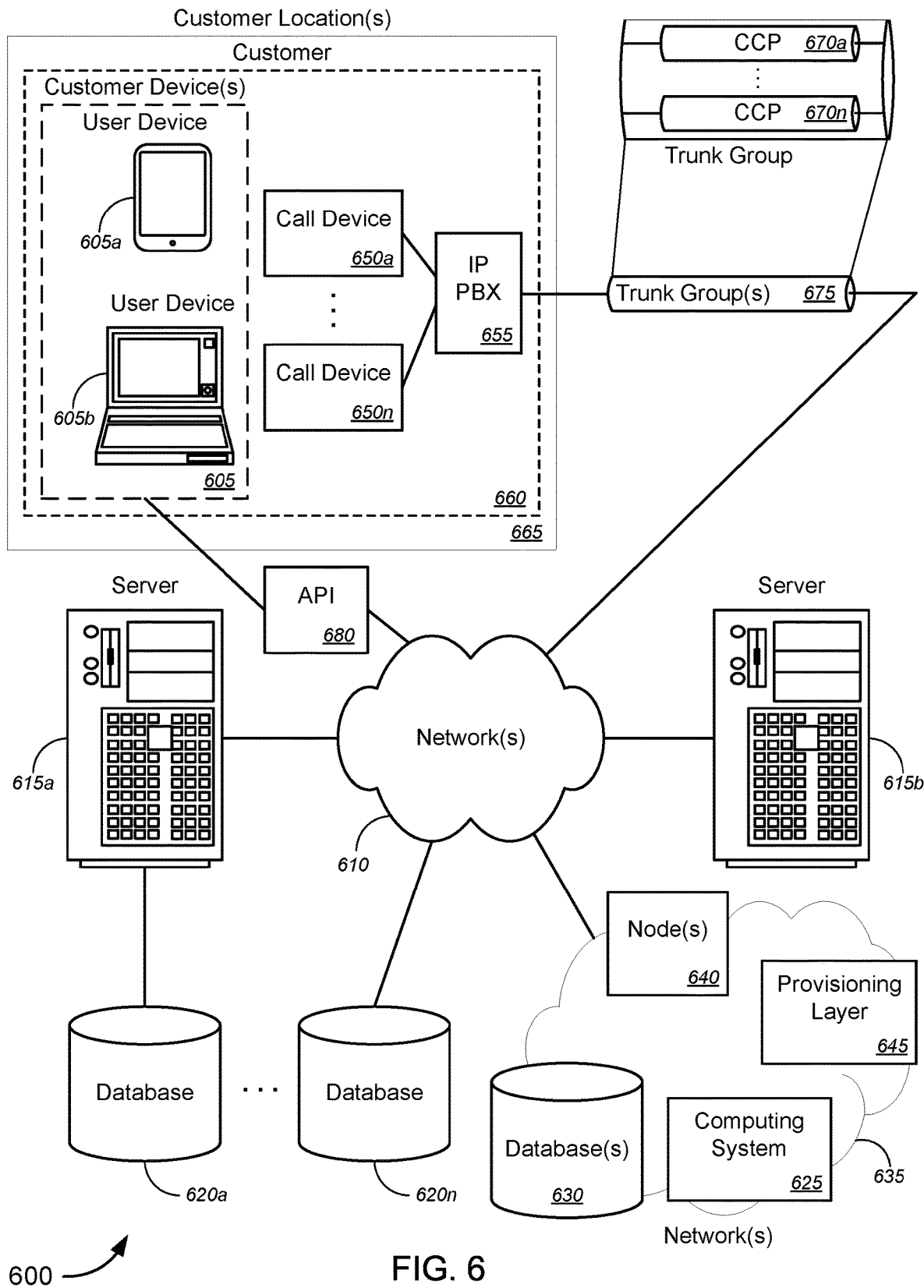
FIG. 6 is a block diagram illustrating a networked system of computers, computing systems, or system hardware architecture, which can be used in accordance with various embodiments.

As noted above, a set of embodiments comprises methods and systems for implementing calling service provisioning, and, more particularly, to methods, systems, and apparatuses for implementing application programming interface ("API")-based concurrent call path ("CCP") provisioning. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to network(s) 115, 115*a* of FIG. 1, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing calling service provisioning, and, more particularly, to methods, systems, and apparatuses for implementing application programming interface ("API")-based concurrent call path ("CCP") provisioning, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise a computing system 625 (similar to computing system 105 of FIG. 1, or the like) and corresponding database(s) 630 (similar to database(s) 110 of FIG. 1, or the like) of network(s) 635 (similar to network(s) 115 and 115a of FIG. 1, or the like). System 600 might further comprise one or more nodes 640 (similar to routers 155 and 175 of FIG. 1, or the like) and a provisioning layer 645 (similar to provisioning layer 185 of FIG. 1, or the like), which may be disposed on network(s) 635. User devices 605a and 605b (collectively, "user devices 605" or the like; similar to user devices 130a-130n of FIG. 1, or the like), telephone 650a-650n (similar to telephones 135a-135n of FIG. 1, or the like), and Internet Protocol private branch exchange ("IP PBX") 655 (similar to IP PBX 140 of FIG. 1, or the like) may be associated with customer 660 (similar to customer 120 of FIG. 1, or the like), which may be located or associated with customer location(s) 665 (similar to customer location(s) 125 of FIG. 1, or the like). System 600 might further comprise one or more trunk groups 670 (similar to trunk groups 150a-150n of FIG. 1, or the like) and one or more concurrent call paths ("CCPs") 675a-675n (collectively, "CCPs 675" or the like; similar to CCPs 145a-145n of FIG. 1, or the like), and application programming interface ("API") 680 (similar to API 180c of FIG. 1, or the like).

In operation, computing system 625 may receive—via gateway, portal, and/or API 680 over a network(s) 610 and/or 635—a CCP provisioning request from a user device 605 (including user devices 605a and 605b, or the like) associated with customer 660. The CCP provisioning request may comprise a request to change a number of CCPs for use by the customer.

The computing system 625 may receive first call network utilization data, the first call network utilization data including, but not limited to, at least one of first data regarding utilization of one or more trunk groups of a first set of trunk groups assigned to the customer, second data regarding capacity of one or more trunk groups of the first set of trunk groups, or third data regarding utilization of one or more CCPs in each trunk group of the first set of trunk groups, and/or the like. In some cases, receiving first call network utilization data may comprise receiving first call network utilization data in one of a responsive manner (i.e., responsive to a specific request), a continual manner, a periodic manner, or a sporadic (or random) manner, and/or the like.

The computing system 625 may determine whether the request to change the number of CCPs for use by the customer would affect the first set of trunk groups assigned to the customer based at least in part on the first call network utilization data. In some cases, the computing system 625 may validate whether the customer is allowed to change the number of CCPs. If so, determining whether the request to change the number of CCPs for use by the customer would affect the first set of trunk groups assigned to the customer may be performed in response to validating that the customer is allowed to change the number of CCPs.

Based on a determination that the request to change the number of CCPs for use by the customer would have a low probability of affecting (or would not affect) the first set of trunk groups assigned to the customer, the computing system 625 may send one or more first instructions in near-real-time to one or more nodes 640 (in some cases, via provisioning layer 645, or the like) in the network(s) 610 and/or 635 to increase or decrease, in near-real-time, the number of CCPs 670 in at least one trunk group of the first set of trunk groups 675 assigned to the customer 660 based on the CCP provisioning request.

Alternatively, based on a determination that the request to change the number of CCPs for use by the customer would have a moderate to high probability of affecting (or would affect) at least one trunk group of the one or more trunk groups assigned to the customer, the computing system 625 may: determine an updated number of trunk groups to assign to the customer based at least in part on a total number of CCPs requested in the request to change the number of CCPs and based at least in part on the first call network utilization data; send one or more second instructions in near-real-time to the one or more nodes in the network to increase or decrease, in near-real-time, the number of trunk groups among the first set of trunk groups assigned to the customer, resulting in a second set of trunk groups assigned to the customer, based at least in part on determined updated number of trunk groups; and send one or more third instructions in near-real-time to the one or more nodes in the network to increase or decrease, in near-real-time, the number of CCPs in at least one trunk group among the second set of trunk groups assigned to the customer based on the CCP provisioning request.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
receiving, using a computing system and via an application programming interface ("API") over a network, a concurrent call path ("CCP") provisioning request from a user device associated with a customer, wherein the CCP provisioning request comprises a request to change a number of CCPs for use by the customer;
receiving, using the computing system, first call network utilization data, the first call network utilization data comprising at least one of first data regarding utilization of one or more trunk groups of a first set of trunk groups assigned to the customer, second data regarding capacity of one or more trunk groups of the first set of trunk groups, or third data regarding utilization of one or more CCPs in each trunk group of the first set of trunk groups;
determining, using the computing system, whether the request to change the number of CCPs for use by the customer would affect the first set of trunk groups assigned to the customer based at least in part on the first call network utilization data;
based on a determination that the request to change the number of CCPs for use by the customer would have a low probability of affecting the first set of trunk groups assigned to the customer, sending, using the computing system, one or more first instructions in near-real-time to one or more nodes in the network to increase or decrease, in near-real-time, the number of CCPs in at least one trunk group of the first set of trunk groups assigned to the customer based on the CCP provisioning request; and
based on a determination that the request to change the number of CCPs for use by the customer would have a moderate to high probability of affecting at least one trunk group of the one or more trunk groups assigned to the customer:
determining, using the computing system, an updated number of trunk groups to assign to the customer based at least in part on a total number of CCPs requested in the request to change the number of CCPs and based at least in part on the first call network utilization data; and
sending, using the computing system, one or more second instructions in near-real-time to the one or more nodes in the network to increase or decrease, in near-real-time, the number of trunk groups among the first set of trunk groups assigned to the customer, resulting in a second set of trunk groups assigned to the customer, based at least in part on determined updated number of trunk group.

2. The method of claim 1, wherein the computing system comprises at least one of an API platform computing system, an API gateway, a customer interface server, a call service reservation and ordering platform server, a gateway controller, a network provisioning server, a network operations center ("NOC"), a cloud computing system, or a distributed computing system.

3. The method of claim 1, wherein each CCP among the one or more CCPs is configurable as one of a bi-directional call path, a uni-directional outgoing call path, or a uni-directional incoming call path.

4. The method of claim 1, wherein each CCP is configured to enable a session initiation protocol ("SIP")-based communication session comprising at least one of a voice over Internet Protocol ("VoIP") call, an IP-based video call, or an instant message over IP.

5. The method of claim 1, wherein receiving the CCP provisioning request from the user device associated with the customer comprises receiving, using the computing system and via the API over the network, a CCP provisioning request through a user interface ("UI") displayed on the user device associated with the customer, wherein the UI comprises one of a portal-based UI, a webpage UI, or a software application ("app") UI running on the user device.

6. The method of claim 5, wherein the UI provides the customer with at least one of:
one or more options to set a maximum utilization threshold for the first set of trunk groups for triggering a request to increase the of CCPs for use by the customer;
one or more options to set a minimum utilization threshold for the first set of trunk groups for triggering a request to decrease the of CCPs for use by the customer;
one or more options to set a maximum capacity threshold for the first set of trunk groups for triggering a request to increase the of CCPs for use by the customer;
one or more options to set a minimum capacity threshold for the first set of trunk groups for triggering a request to decrease the of CCPs for use by the customer;
one or more options to set a maximum utilization threshold for the one or more CCPs in each trunk group of the first set of trunk groups for triggering a request to increase the of CCPs for use by the customer;
one or more options to set a minimum utilization threshold for the one or more CCPs in each trunk group of the first set of trunk groups for triggering a request to decrease the of CCPs for use by the customer;
one or more options to change route plans;
one or more options to set rules to automatically change route plans;
one or more options to receive utilization reports;
one or more options to set rules to automatically receive utilization reports;
one or more options to receive trunk group inventory reports;
one or more options to set rules to automatically receive trunk group inventory reports;
one or more options to manually increase or decrease a number of CCPs;
one or more options to set rules to automatically increase or decrease a number of CCPs;
one or more options to manually increase or decrease a number of trunk groups;
one or more options to set rules to automatically increase or decrease a number of trunk groups; or
one or more options to set rules to send a notification to the customer in response to exceeding preset or default values for utilization threshold or capacity threshold.

7. The method of claim 1, wherein receiving first call network utilization data comprises receiving, using the computing system, first call network utilization data in one of a responsive manner, a continual manner, a periodic manner, or a sporadic manner.

8. The method of claim 1, further comprising:
receiving, using the computing system and via the API over the network, a utilization report request from the user device associated with the customer, wherein the utilization report request comprises a request for the computing system to send to the customer a utilization report summarizing at least one of current, average, or historical utilization data for each CCP and each trunk group assigned to the customer; and
in response to receiving the utilization report request, generating, using the computing system, a utilization report based at least in part on the received first call network utilization data, and sending, using the computing system, the utilization report to the customer.

9. The method of claim 8, wherein sending the utilization report to the customer comprises sending, using the computing system, the utilization report as at least one of:
one or more utilization data packets via the API to the user device;
one or more utilization data packets via the API to one or more user devices designated by the customer;
a graphics and text-based utilization report via electronic mail ("e-mail") to one or more e-mail addresses associated with the customer;
a graphics and text-based utilization report via e-mail to one or more e-mail addresses designated by the customer;
a graphics and text-based utilization report via physical mail to one or more physical addresses associated with the customer;
a graphics and text-based utilization report via physical mail to one or more physical addresses designated by the customer;
a graphics and text-based utilization report via a web-portal accessible by the customer;
a text-based utilization summary report via one or more text messages to the user device;
a text-based utilization summary report via one or more text messages to one or more user devices designated by the customer;
a graphics and text-based utilization summary report via one or more multi-media messages to the user device; or
a graphics and text-based utilization summary report via one or more multi-media messages to one or more user devices designated by the customer.

10. The method of claim 1, wherein the utilization report request and the CCP provisioning request are automatically sent by the user device based on one or more preset triggers or thresholds established by the customer.

11. The method of claim 1, wherein determining that the request to change the number of CCPs for use by the customer would have a low probability of affecting the first set of trunk groups assigned to the customer comprises at least one of:
determining that an increase in the number of CCPs for use by the customer would have a low probability of overloading the first set of trunk groups based at least in part on the first call network utilization data;

determining that a decrease in the number of CCPs for use by the customer would have a low probability of resulting in excess capacity of the first set of trunk groups beyond a predetermined threshold amount based at least in part on the first call network utilization data; or determining that the first set of trunk groups has only one trunk group and the request to change the number of CCPs comprises a request to decrease the number of CCPs for use by the customer.

12. The method of claim 1, wherein the request to change the number of CCPs comprises a request to increase the number of CCPs for use by the customer by a first number of additional CCPs, wherein determining the updated number of trunk groups to assign to the customer comprises:

determining, using the computing system, an estimated maximal extent to which the first number of additional CCPs would additionally load the first set of trunk groups based at least in part on the first call network utilization data; and determining, using the computing system, how many trunk groups to add based at least in part on the determined estimated maximal extent to which the first number of additional CCPs would additionally load the first set of trunk groups.

13. The method of claim 1, wherein the request to change the number of CCPs comprises a request to decrease the number of CCPs for use by the customer by a second number of fewer CCPs, wherein determining the updated number of trunk groups to assign to the customer comprises:

determining, using the computing system, an estimated maximal extent to which the second number of fewer CCPs would reduce load of the first set of trunk groups based at least in part on the first call network utilization data; and determining, using the computing system, how many trunk groups to reduce by based at least in part on the determined estimated maximal extent to which the second number of fewer CCPs would reduce load of the first set of trunk groups.

14. The method of claim 1, further comprising:

validating, using the computing system, whether the customer is allowed to change the number of CCPs, wherein determining whether the request to change the number of CCPs for use by the customer would affect the first set of trunk groups assigned to the customer is performed in response to validating that the customer is allowed to change the number of CCPs.

15. An apparatus, comprising:

at least one processor; and a non-transitory computer readable medium communicatively coupled to the at least one processor, the non-transitory computer readable medium having stored thereon computer software comprising a set of instructions that, when executed by the at least one processor, causes the apparatus to:

receive, via an application programming interface ("API") over a network, a concurrent call path ("CCP") provisioning request from a user device associated with a customer, wherein the CCP provisioning request comprises a request to change a number of CCPs for use by the customer;

receive first call network utilization data, the first call network utilization data comprising at least one of first data regarding utilization of one or more trunk groups of a first set of trunk groups assigned to the customer, second data regarding capacity of one or more trunk groups of the first set of trunk groups, or third data regarding utilization of one or more CCPs in each trunk group of the first set of trunk groups;

determine whether the request to change the number of CCPs for use by the customer would affect the first set of trunk groups assigned to the customer based at least in part on the first call network utilization data;

based on a determination that the request to change the number of CCPs for use by the customer would have a low probability of affecting the first set of trunk groups assigned to the customer, send one or more first instructions in near-real-time to one or more nodes in the network to increase or decrease, in near-real-time, the number of CCPs in at least one trunk group of the first set of trunk groups assigned to the customer based on the CCP provisioning request; and based on a determination that the request to change the number of CCPs for use by the customer would have a moderate to high probability of affecting at least one trunk group of the one or more trunk groups assigned to the customer:

determine an updated number of trunk groups to assign to the customer based at least in part on a total number of CCPs requested in the request to change the number of CCPs and based at least in part on the first call network utilization data; and send one or more second instructions in near-real-time to the one or more nodes in the network to increase or decrease, in near-real-time, the number of trunk groups among the first set of trunk groups assigned to the customer, resulting in a second set of trunk groups assigned to the customer, based at least in part on determined updated number of trunk groups.

16. A system, comprising:

a computing system, comprising:

at least one first processor; and a first non-transitory computer readable medium communicatively coupled to the at least one first processor, the first non-transitory computer readable medium having stored thereon computer software comprising a first set of instructions that, when executed by the at least one first processor, causes the computing system to:

receive, via an application programming interface ("API") over a network, a concurrent call path ("CCP") provisioning request from a user device associated with a customer, wherein the CCP provisioning request comprises a request to change a number of CCPs for use by the customer;

receive first call network utilization data, the first call network utilization data comprising at least one of first data regarding utilization of one or more trunk groups of a first set of trunk groups assigned to the customer, second data regarding capacity of one or more trunk groups of the first set of trunk groups, or third data regarding utilization of one or more CCPs in each trunk group of the first set of trunk groups;

determine whether the request to change the number of CCPs for use by the customer would affect the first set of trunk groups assigned to the customer based at least in part on the first call network utilization data;

based on a determination that the request to change the number of CCPs for use by the customer would have a low probability of affecting the first set of trunk groups assigned to the customer, send one or more first instructions in near-real-time to one or more nodes in the network to increase or decrease, in near-real-time, the number of CCPs in at least one trunk group of the first set of trunk groups assigned to the customer based on the CCP provisioning request; and based on a determination that the request to change the number of CCPs for use by the customer would have a moderate to high probability of affecting at least one trunk group of the one or more trunk groups assigned to the customer:
  determine an updated number of trunk groups to assign to the customer based at least in part on a total number of CCPs requested in the request to change the number of CCPs and based at least in part on the first call network utilization data; and
  send one or more second instructions in near-real-time to the one or more nodes in the network to increase or decrease, in near-real-time, the number of trunk groups among the first set of trunk groups assigned to the customer, resulting in a second set of trunk groups assigned to the customer, based at least in part on determined updated number of trunk groups.

17. The system of claim 16, wherein the computing system comprises at least one of an API platform computing system, an API gateway, a customer interface server, a call service reservation and ordering platform server, a gateway controller, a network provisioning server, a network operations center ("NOC"), a cloud computing system, or a distributed computing system.

18. The system of claim 16, wherein the first set of instructions, when executed by the at least one first processor, further causes the computing system to:
  receive, via the API over the network, a utilization report request from the user device associated with the customer, wherein the utilization report request comprises a request for the computing system to send to the customer a utilization report summarizing at least one of current, average, or historical utilization data for each CCP and each trunk group assigned to the customer; and
  in response to receiving the utilization report request, generate a utilization report based at least in part on the received first call network utilization data, and send the utilization report to the customer.

19. The system of claim 16, wherein receiving the CCP provisioning request from the user device associated with the customer comprises receiving, via the API over the network, a CCP provisioning request through a user interface ("UI") displayed on the user device associated with the customer, wherein the UI comprises one of a portal-based UI, a webpage UI, or a software application ("app") UI running on the user device.

20. The system of claim 19, wherein the UI provides the customer with at least one of:
  one or more options to set a maximum utilization threshold for the first set of trunk groups for triggering a request to increase the of CCPs for use by the customer;
  one or more options to set a minimum utilization threshold for the first set of trunk groups for triggering a request to decrease the of CCPs for use by the customer;
  one or more options to set a maximum capacity threshold for the first set of trunk groups for triggering a request to increase the of CCPs for use by the customer;
  one or more options to set a minimum capacity threshold for the first set of trunk groups for triggering a request to decrease the of CCPs for use by the customer;
  one or more options to set a maximum utilization threshold for the one or more CCPs in each trunk group of the first set of trunk groups for triggering a request to increase the of CCPs for use by the customer;
  one or more options to set a minimum utilization threshold for the one or more CCPs in each trunk group of the first set of trunk groups for triggering a request to decrease the of CCPs for use by the customer;
  one or more options to change route plans;
  one or more options to set rules to automatically change route plans;
  one or more options to receive utilization reports;
  one or more options to set rules to automatically receive utilization reports;
  one or more options to receive trunk group inventory reports;
  one or more options to set rules to automatically receive trunk group inventory reports;
  one or more options to manually increase or decrease a number of CCPs;
  one or more options to set rules to automatically increase or decrease a number of CCPs;
  one or more options to manually increase or decrease a number of trunk groups;
  one or more options to set rules to automatically increase or decrease a number of trunk groups; or
  one or more options to set rules to send a notification to the customer in response to exceeding preset or default values for utilization threshold or capacity threshold.

* * * * *